(12) United States Patent
Sakai et al.

(10) Patent No.: US 11,072,236 B2
(45) Date of Patent: Jul. 27, 2021

(54) FUEL SUPPLY DEVICE

(71) Applicant: Toyota Jidosha Kabushiki Kaisha, Toyota (JP)

(72) Inventors: Takanori Sakai, Okazaki (JP); Shinji Shimokawa, Seto (JP); Toshikazu Ito, Toyota (JP); Kazuhiro Tashiro, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 4 days.

(21) Appl. No.: 16/175,060

(22) Filed: Oct. 30, 2018

(65) Prior Publication Data
US 2019/0152314 A1 May 23, 2019

(30) Foreign Application Priority Data
Nov. 20, 2017 (JP) .............................. JP2017-222809

(51) Int. Cl.
*B60K 15/035* (2006.01)
*B60K 15/04* (2006.01)
*B60K 15/03* (2006.01)

(52) U.S. Cl.
CPC ........ *B60K 15/03519* (2013.01); *B60K 15/04* (2013.01); *B60K 2015/03296* (2013.01);
(Continued)

(58) Field of Classification Search
CPC .......... B60K 2015/035; B60K 2015/04; B60K 2015/03519; B60K 2015/03296; B60K 2015/03538; B60K 2015/03552; B60K 2015/03576; B60K 2015/03585; B60K 2015/047; B65D 51/1644; Y10T 137/87925; Y10T 137/87933; Y10T 137/87941; Y10T 137/87949; Y10T 137/87957; Y10T 137/87965; Y10T 137/97973; Y10T 137/9029; F02M 25/0836; F02M 25/0872; F02M 37/0017;
(Continued)

(56) References Cited

U.S. PATENT DOCUMENTS 3,465,911 A * 9/1969 Colarusso .............. B65D 25/48
220/86.1
4,062,384 A * 12/1977 Frahm ...................... B67D 7/54
141/46

(Continued)

FOREIGN PATENT DOCUMENTS

| DE | 19901080 A1 | 7/2000 |
| JP | H05301530 A | 11/1993 |
| JP | 2003-252071 A | 9/2003 |

*Primary Examiner* — Craig J Price
(74) *Attorney, Agent, or Firm* — Dinsmore & Shohl LLP

(57) ABSTRACT

A fuel supply device includes an inlet pipe, a first end of the inlet pipe configured to be connected to an oil supply port and a second end of the inlet pipe configured to be connected to a fuel tank and an air flow path, an upstream side end of the air flow path configured to be open to the outside and a downstream side end of the air flow path configured to be connected to the fuel tank. The air flow path includes a negative pressure valve configured to move a valve body to open a valve port when the pressure in the fuel tank becomes a negative pressure and an air filter disposed upstream of the negative pressure valve.

7 Claims, 11 Drawing Sheets

(52) U.S. Cl.
CPC ........... *B60K 2015/03538* (2013.01); *B60K 2015/03552* (2013.01); *B60K 2015/03576* (2013.01); *B60K 2015/03585* (2013.01); *B60K 2015/047* (2013.01)

(58) Field of Classification Search
CPC ..... F02M 37/00; F02M 37/0023; F16L 37/38; F16K 17/04; F01N 3/208; F01N 2610/02; F01N 2610/1466; Y02T 10/12; Y02T 10/24; Y02A 50/2325; Y02A 50/20
USPC ....... 137/199, 587, 588; 220/746, 748, 86.2, 220/203.27, 203.23, 203.19, 203.01, 220/DIG. 33; 141/44, 51, 59, 350, 301; 123/516–520
See application file for complete search history.

(56) References Cited

U.S. PATENT DOCUMENTS

| | | | | | |
|---|---|---|---|---|---|
| 4,798,306 | A | * | 1/1989 | Giacomazzi | B60K 15/03519 137/588 |
| 4,874,020 | A | * | 10/1989 | Bucci | B60K 15/0406 141/59 |
| 4,877,146 | A | * | 10/1989 | Harris | B60K 15/03504 220/746 |
| 4,917,157 | A | * | 4/1990 | Gifford | B60K 15/04 123/519 |
| 4,941,587 | A | * | 7/1990 | Terada | B60K 15/04 220/86.2 |
| 4,946,060 | A | * | 8/1990 | Sherwood | F02M 25/0872 220/86.2 |
| 4,955,950 | A | * | 9/1990 | Seiichi | B60K 15/04 137/587 |
| 5,056,493 | A | * | 10/1991 | Holzer | B60K 15/00 123/516 |
| 5,071,018 | A | * | 12/1991 | Moore | B60K 15/03519 220/86.2 |
| 5,103,877 | A | * | 4/1992 | Sherwood | B60K 15/03519 123/519 |
| 5,404,906 | A | * | 4/1995 | Aoshima | B60K 15/03504 123/519 |
| 6,105,612 | A | * | 8/2000 | Schaar | B60K 15/035 123/519 |
| 6,880,593 | B1 | * | 4/2005 | Swane | B29C 66/61 141/286 |
| 7,527,044 | B2 | * | 5/2009 | Dunkle | F02M 25/0854 123/519 |
| 8,459,237 | B2 | * | 6/2013 | Erdmann | B60K 15/03519 123/516 |
| 8,960,473 | B2 | * | 2/2015 | Grun | B60K 15/03504 220/86.2 |
| 9,102,228 | B2 | * | 8/2015 | Sasaki | B60K 15/04 |
| 9,315,098 | B2 | * | 4/2016 | Lee | F01N 3/208 |
| 9,592,730 | B2 | * | 3/2017 | Revink | B60K 15/03519 |
| 10,308,109 | B2 | * | 6/2019 | Hatanaka | B60K 15/035 |
| 10,493,842 | B2 | * | 12/2019 | Hatanaka | B60K 15/04 |
| 2003/0089406 | A1 | * | 5/2003 | Pozgainer | B60K 15/03519 137/588 |
| 2006/0157117 | A1 | | 7/2006 | Scott | |
| 2010/0224284 | A1 | * | 9/2010 | Kolberg | F01N 3/2066 141/325 |
| 2013/0014730 | A1 | * | 1/2013 | Shimura | F02M 25/089 123/520 |
| 2019/0275881 | A1 | * | 9/2019 | Kojima | B60K 15/03519 |

\* cited by examiner

FUEL SUPPLY DEVICE

CROSS-REFERENCE TO RELATED APPLICATIONS

This application claims priority to Japanese Patent Application No. 2017-222809 filed on Nov. 20, 2017, which is incorporated herein by reference in its entirety including the specification, drawings and abstract.

BACKGROUND

1. Technical Field

The present disclosure relates to a fuel supply device.

2. Description of Related Art

Japanese Unexamined Patent Application Publication No. 05-301530 (JP 05-301530 A) discloses a technique in which, as means for causing air in the atmosphere to flow into a fuel tank when the pressure in the fuel tank of an automobile becomes lower than the atmospheric pressure and becomes a negative pressure, an air flow path through which the atmosphere and the inside of an inlet pipe communicate with each other is formed in a fuel cap that opens and closes an oil supply port of the inlet pipe and the air flow path is provided with a negative pressure valve. The air flow path in the fuel cap is formed into a curved path as means for restraining dust in the atmosphere from entering a tiller pipe when air in the atmosphere flows into the inlet pipe with the negative pressure valve opened and a dust collecting recess portion for collecting dust is provided upstream of the negative pressure valve in the air flow path.

SUMMARY

In the case of the fuel cap, dust collected in the dust collecting recess portion may be whirled up by an air stream passing through the air flow path and the dust may adhere to a valve seat or a valve body of the negative pressure valve since the dust collecting recess portion faces the air flow path. In a case where the dust adheres to the negative pressure valve, the negative pressure valve is not fully closed because the dust is caught between the valve seat and the valve body when the negative pressure valve is closed.

The disclosure provides a fuel supply device with which it is possible to achieve an improvement in reliability of a negative pressure valve.

An aspect of the disclosure relates to a fuel supply device including an inlet pipe and an air flow path. A first end of the inlet pipe is configured to be connected to an oil supply port and a second end of the inlet pipe is configured to be connected to a fuel tank. An upstream side end of the air flow path is configured to be open to the outside and a downstream side end of the air flow path is configured to be connected to the fuel tank. The air flow path includes a negative pressure valve and an air filter. The negative pressure valve is configured to move a valve body to open a valve port when the pressure in the fuel tank becomes a negative pressure. The air filter is disposed upstream of the negative pressure valve.

In the fuel supply device according to the aspect of the disclosure, the negative pressure valve and the air filter may be integrated with each other and may constitute a valve module that is detachable from the air flow path. In this case, the workability at the time of maintenance of the air filter or the negative pressure valve is favorable.

The fuel supply device according to the aspect of the disclosure may further include a breather pipe configured to connect the inlet pipe and the fuel tank to each other, and a canister pipe, a first end of the canister pipe configured to be open to the outside and a second end of the canister pipe configured to be connected to a canister. The negative pressure valve may be configured to connect the breather pipe and the canister pipe to each other. In this case, the breather pipe and the canister pipe are integrated with each other via the negative pressure valve. Therefore, vibration of the breather pipe and the canister pipe during traveling can be further suppressed.

In the fuel supply device according to the aspect of the disclosure, the negative pressure valve may be provided on an outer circumference of the inlet pipe or an outer circumference of the breather pipe, and the air filter may be disposed to cover the outer circumference of the inlet pipe and the negative pressure valve or to cover the outer circumference of the breather pipe and the negative pressure valve. In this case, it is possible to achieve space-saving in comparison with a case where the negative pressure valve and the air filter are provided to protrude in a radial direction from the outer circumference of the inlet pipe or the outer circumference of the breather pipe.

The fuel supply device according to the aspect of the disclosure may further include a valve housing and a filter unit. The negative pressure valve may include a primary chamber and a secondary chamber. The secondary chamber may be formed in the valve housing and the valve body may be accommodated in the secondary chamber. The primary chamber may be formed in the filter unit and the inside of the primary chamber may be partitioned into an introducing chamber communicating with the atmosphere and a clean chamber facing the valve port by the air filter. The filter unit may be configured to be detachable from the valve housing. In this case, the workability at the time of maintenance of the air filter is favorable.

In the fuel supply device according to the aspect of the disclosure, the negative pressure valve may include a cylindrical portion that accommodates the valve body and the cylindrical portion may integrally protrude in a radial direction from a circumferential surface of the inlet pipe. In this case, the number of components can be reduced in comparison with a case where the cylindrical portion and the inlet pipe are provided separately from each other.

In the fuel supply device according to die aspect of the disclosure, the negative pressure valve may include a cylindrical portion that accommodates the valve body and the cylindrical portion may integrally protrude in a radial direction from a circumferential surface of the breather pipe.

According to the aspect of the disclosure, air in the atmosphere flows into the fuel tank after sequentially passing through the air filter and the negative pressure, valve when the negative pressure valve is opened. However, the dust in the atmosphere does not reach the negative pressure valve since the dust cannot pass through the air filter. Therefore, it is possible to prevent a malfunction of the negative pressure valve that occurs when the dust in the atmosphere is caught.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Example 1

Figure 1:
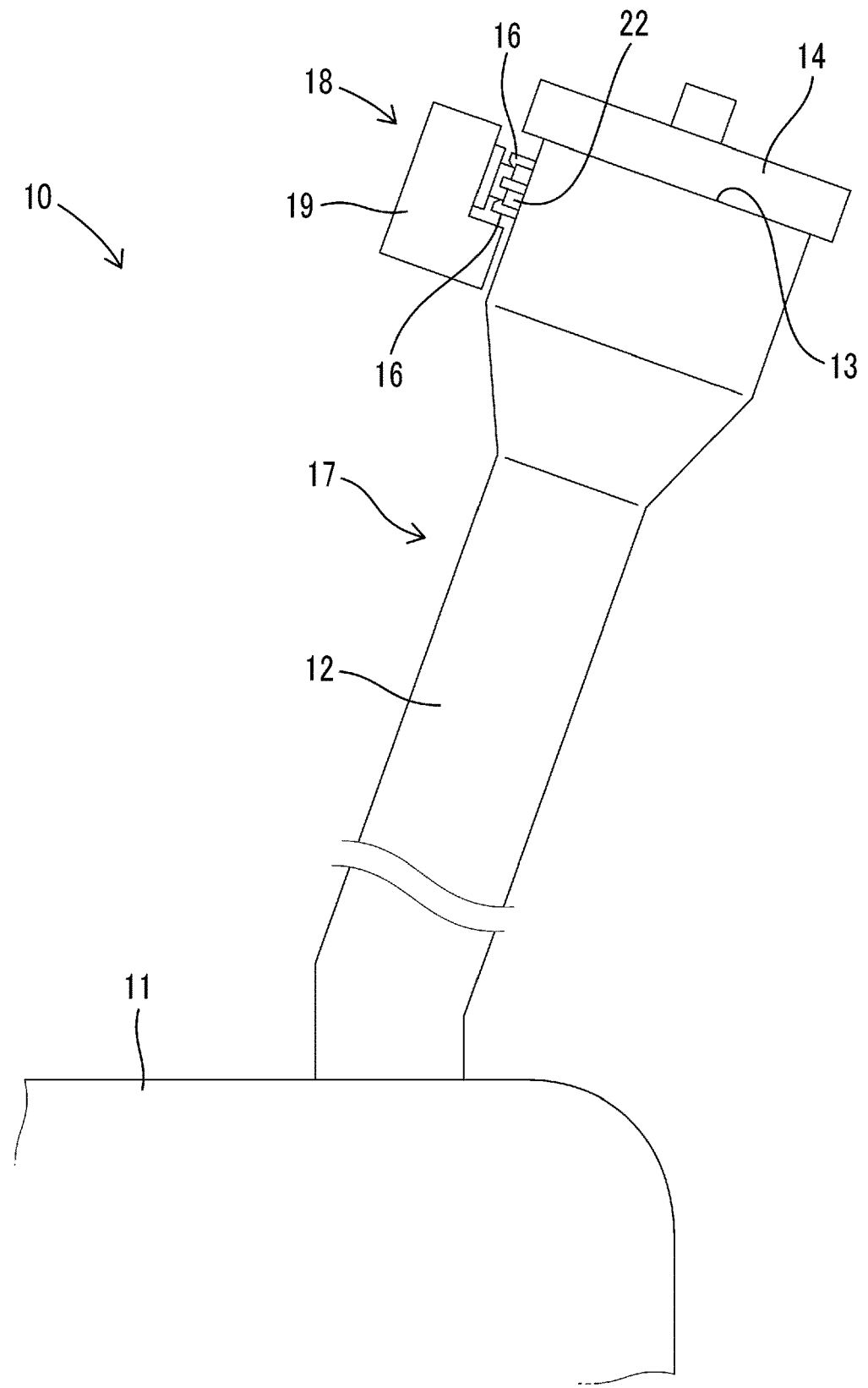
FIG. 1 is a front view of a fuel supply device according to Example 1.
Figure 2:
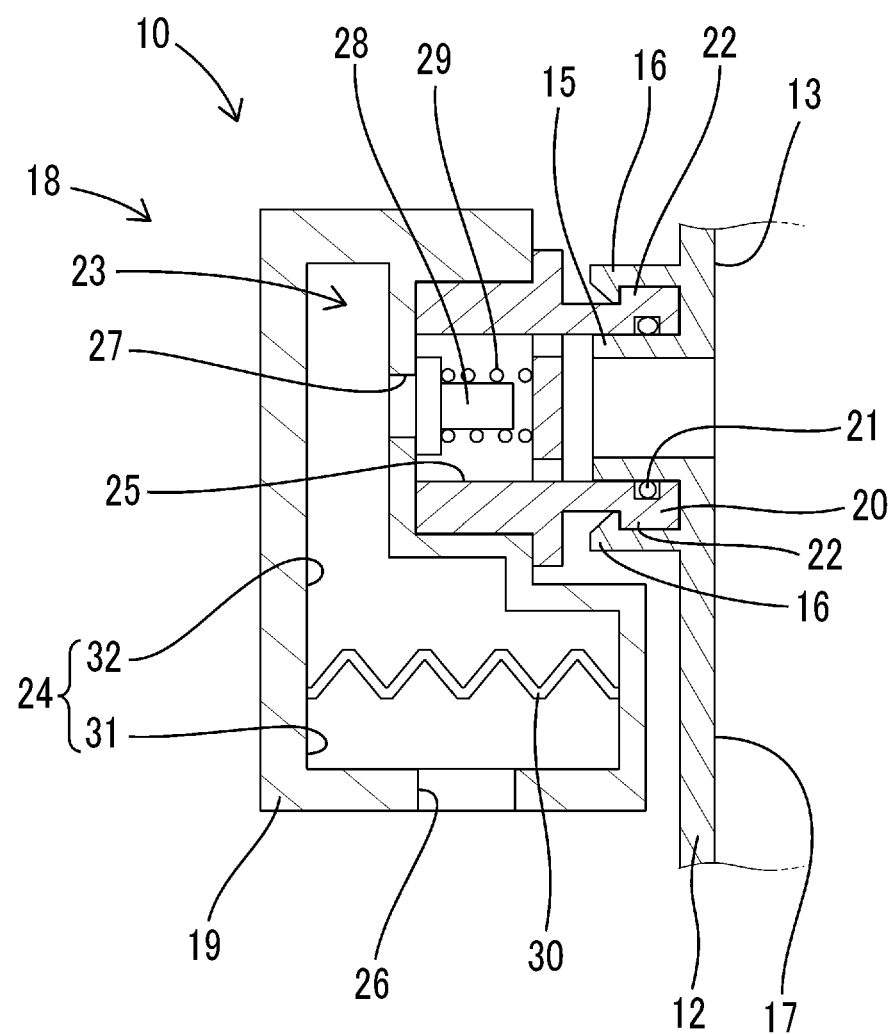
FIG. 2 is a sectional front view of a valve module.

Hereinafter, Example 1 which is a specific example of the aspect of the disclosure will be described with reference to FIGS. 1 and 2. Regarding the vertical direction, directions in FIGS. 1 and 2 will be referred to as upward and downward directions in the following description. Regarding the horizontal direction, directions in FIGS. 1 and 2 will be referred to as rightward and leftward directions.

A fuel supply device 10 in Example 1 is provided with a fuel tank 11, an inlet pipe 12 for supplying fuel to the fuel tank 11, a fuel cap 14 that opens and closes a fuel or oil supply port 13 of the inlet pipe 12, and a valve module 18. A lower end portion of the inlet pipe 12 (downstream side end of oil supply path) is connected to the fuel tank 11 such that the lower end portion communicates with the fuel tank 11. In a state where the fuel cap 14 is attached to the inlet pipe 12, the oil supply port 13 is air-tightly closed.

A cylindrical attachment portion 15 for attaching the valve module 18 to the inlet pipe 12 is formed to protrude on an outer circumference of an upstream side end portion (position near oil supply port 13) of the inlet pipe 12. The internal space of the cylindrical attachment portion 15 communicates with the inside of the inlet pipe 12 (fuel inflow path). A plurality of elastic locking pieces 16 disposed to surround the cylindrical attachment portion 15 is formed to protrude on an outer circumference of the inlet pipe 12.

An area from the cylindrical attachment portion 15 of the inlet pipe 12 to the fuel tank 11 constitutes an air flow path 17 for causing air in the atmosphere to flow into the fuel tank 11 in a case where the pressure in the fuel tank 11 becomes a negative pressure (becomes lower than atmospheric pressure).

The valve module 18 is obtained by accommodating a normally closed negative pressure valve 23 and an air filter 30 in a housing 19 and integrating the negative pressure valve 23 and the air filter 30 with each other. The housing 19 is obtained by assembling and combining a plurality of members. A cylindrical fitting portion 20 is formed on a side surface of the housing 19. A seal ring 21 is mounted onto an inner circumference of the cylindrical fitting portion 20. A stepped locking portion 22 is formed on an outer circumference of the cylindrical fitting portion 20. The valve module 18 is attached to the outer circumference of an upper end portion of the inlet pipe 12 when the cylindrical fitting portion 20 is externally fitted onto the cylindrical attachment portion 15 and the elastic locking pieces 16 are engaged with the locking portion 22.

In the housing 19, a primary chamber 24 and a secondary chamber 25 that constitute the negative pressure valve 23 are provided. The primary chamber 24 and the secondary chamber 25 constitute the air flow path 17 along with the inlet pipe 12. An introducing port 26 through which the primary chamber 24 and the atmosphere communicate with each other is formed in a lower end portion of the primary chamber 24 (upstream side end of air flow path 17). The secondary chamber 25 is disposed to be horizontally adjacent to an upper end portion of the primary chamber 24 and communicates with the internal space of the cylindrical fitting portion 20.

A partition wall that separates the secondary chamber 25 and the primary chamber 24 from each other is formed with a valve port 27 that penetrates the partition wall. In the secondary chamber 25, a valve body 28 for opening and closing the valve port 27 and a spring member 29 that urges the valve body 28 in a valve closing direction are accommodated. The secondary chamber 25 communicates with the inlet pipe 12 (air flow path 17) via the cylindrical fitting portion 20 and the cylindrical attachment portion 15.

In a usual state, the valve body 28 air-tightly closes the valve port 27 due to an urging force of the spring member 29 so that the negative pressure valve 23 is maintained in a closed state in which the primary chamber 24 and the secondary chamber 25 are air-tightly isolated from each other. When the pressure in the secondary chamber 25 (in fuel tank 11) becomes lower than the pressure in the primary chamber 24, the valve body 28 moves against the urging force of the spring member 29 in a direction such that the valve port 27 is opened. Therefore, the primary chamber 24 and the secondary chamber 25 communicate with each other and the negative pressure valve 23 enters an opened state. When the negative pressure valve 23 enters the opened state, air in the atmosphere is introduced into the primary chamber 24 via the introducing port 26 and the air flows into the fuel tank 11 after sequentially passing through the valve port 27, the secondary chamber 25, the cylindrical fitting portion 20, the cylindrical attachment portion 15, and the air flow path 17 (inlet pipe 12).

Since dust floats in the atmosphere (air), when the negative pressure valve 23 is opened, the dust flows into the primary chamber 24 along with the air. In a case where the dust adheres to the valve port 27 or the valve body 28 of the negative pressure valve 23, the negative pressure valve 23 may not be fully closed because the dust is caught between an opening edge of the valve port 27 and the valve body 28 when the negative pressure valve 23 is closed.

As a countermeasure for the above-described problem, the primary chamber 24 in the fuel supply device 10 according to Example 1 is vertically partitioned by the bellows-shaped air filter 30. The air filter 30 allows the atmospheric air (air) to pass through the air filter 30 while the air filter 30 inhibits the dust in the atmosphere from passing through the air filter 30. A space below the air filter 30 in the primary chamber 24 (space that is upstream of air filter 30 in air flow path 17) is an introducing chamber 31 that is open to the atmosphere at the introducing port 26. A space above the air filter 30 in the primary chamber 24 (space that is downstream of air filter 30 in air flow path 17) is a clean chamber 32 that can communicate with the secondary chamber 25 via the valve port 27.

The dust in the air is captured by the air filter 30 during a process in which the pressure in the fuel tank 11 becomes a negative pressure, the negative pressure valve 23 is opened, and air flowing into the introducing chamber 31 (primary chamber 24) via the introducing port 26 passes through the air filter 30. Therefore, clean air mixed with substantially no dust flows into the clean chamber 32. Accordingly; there is no possibility that the dust is caught between the opening edge of the valve port 27 and the valve body 28 when the negative pressure valve 23 is closed.

The fuel supply device 10 according to Example 1 includes the inlet pipe 12 configured such that a first end of the inlet pipe 12 is connected to the oil supply port 13 and a second end of the inlet pipe 12 is connected to the fuel tank 11 and the air flow path 17 configured such that an upstream side end of the air flow path 17 is open to the outside and a downstream side end of the air flow path 17 is connected to the fuel tank 11. The air flow path 17 includes the negative pressure valve 23 configured such that the valve body is moved and the valve port is opened when the pressure in the fuel tank 11 becomes a negative pressure and the air filter 30 disposed upstream of the valve port 27 (secondary chamber 25) of the negative pressure valve 23.

In the case of the above-described configuration, air in the atmosphere flows into the fuel tank 11 after sequentially passing through the air filter 30 and the negative pressure valve 23 when the negative pressure valve 23 is opened. However, the dust in the atmosphere does not reach the negative pressure valve 23 since the dust cannot pass through the air filter 30. Therefore, it is possible to prevent a malfunction of the negative pressure valve 23 that occurs when the dust in the atmosphere is caught.

The negative pressure valve 23 and the air filter 30 are integrated with each other via the housing 19 and constitute the valve module IS. The valve module 18 is detachable from the inlet pipe 12 that constitutes the air flow path 17. Therefore, at the time of maintenance of the air filter 30 or the negative pressure valve 23, it is possible to detach the valve module 18 from the inlet pipe 12 by elastically deforming the elastic locking pieces 16 and releasing the elastic locking pieces 16 from the locking portion 22. Since the housing 19 is obtained by assembling and combining a plurality of members, the air filter 30 or the negative pressure valve 23 can be detached when the housing 19 is disassembled. Therefore, the workability at the time of maintenance is favorable.

Example 2

Figure 3:
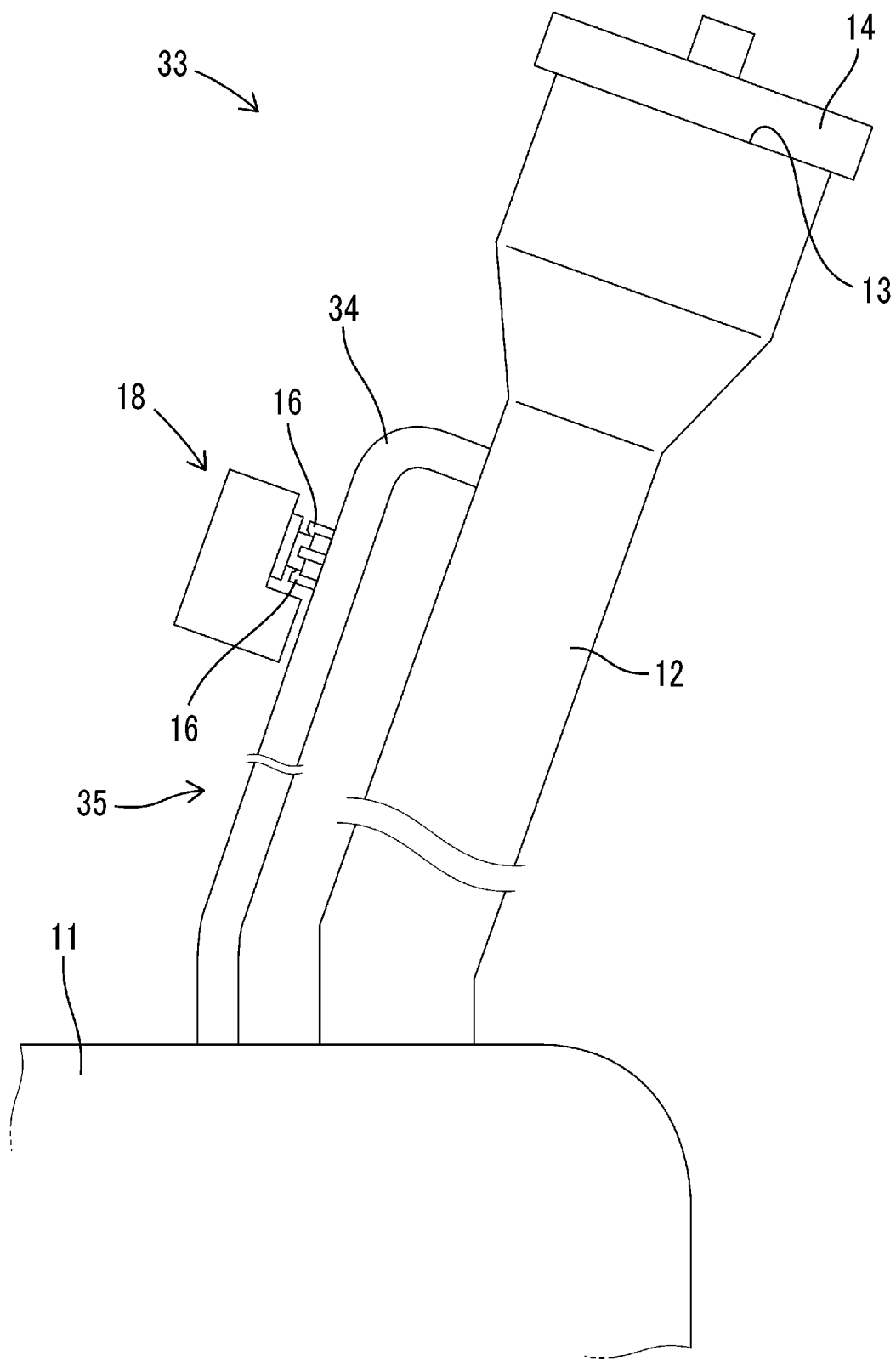
FIG. 3 is a front view of a fuel supply device according to Example 2.

Example 2 which is a specific example of the aspect of the disclosure will be described with reference to FIG. 3. Regarding the vertical direction, directions in FIG. 3 will be referred to as upward and downward directions in the following description. Regarding the horizontal direction, directions in FIG. 3 will be referred to as rightward and leftward directions.

A fuel supply device 33 in Example 2 is obtained by making the configuration of an air flow path 35 different from that in Example 1. Since the other components are the same as those in Example 1, the same components are given the same reference numerals and description of configurations, operations, and effects thereof will be omitted.

The fuel supply device 33 in Example 2 is provided with the inlet pipe 12 for supplying fuel to the fuel tank 11, the fuel cap 14 that opens and closes the oil supply port 13 of the inlet pipe 12, a breather pipe 34 through which air in the fuel tank 11 is discharged to the outside while oil is being supplied, and the valve module 18. A lower end portion of the inlet pipe 12 (downstream side end of oil supply path) is connected to the fuel tank 11 such that the lower end portion communicates with the fuel tank 11.

In a state where the fuel cap 14 is attached to the inlet pipe 12, the oil supply port 13 is air-tightly closed. An upper end portion of the breather pipe 34 is connected to a portion of the inlet pipe 12 that is positioned slightly below the oil supply port 13 (positioned downstream of oil supply port 13 in oil supply path) such that the upper end portion communicates with the inlet pipe 12. The lower end portion of the breather pipe 34 is connected to the fuel tank 11 such that the lower end portion communicates with the fuel tank 11.

The cylindrical attachment portion 15 (not shown in FIG. 3) for attaching the valve module 18 to the breather pipe 34 is formed to protrude on an outer circumference of the breather pipe 34. The internal space of the cylindrical attachment portion 15 communicates with the inside of the breather pipe 34. The elastic locking pieces 16 disposed to surround the cylindrical attachment portion 15 is formed to protrude on the outer circumference of the breather pipe 34.

An area from the cylindrical attachment portion 15 of the breather pipe 34 to the fuel tank 11 constitutes the air flow path 35 for causing air in the atmosphere to flow into the fuel tank 11 in a case where the pressure in the fuel tank 11 becomes a negative pressure (becomes lower than atmospheric pressure). The configuration and the operation effect of the valve module 18 are the same as those in Example 1. In the following description, the valve module 18 will be given the reference numeral in the document.

The dust in the air is captured by the air filter 30 during a process in which the pressure in the fuel tank 11 becomes a negative pressure, the negative pressure valve 23 is opened, and air flowing into the introducing chamber 31 (primary chamber 24) via the introducing port 26 passes through the air filter 30. Therefore, clean air mixed with substantially no dust flows into the clean chamber 32. Accordingly, there is no possibility that the dust is caught between the opening edge of the valve port 27 and die valve body 28 when the negative pressure valve 23 is closed.

Example 3

Figure 4:
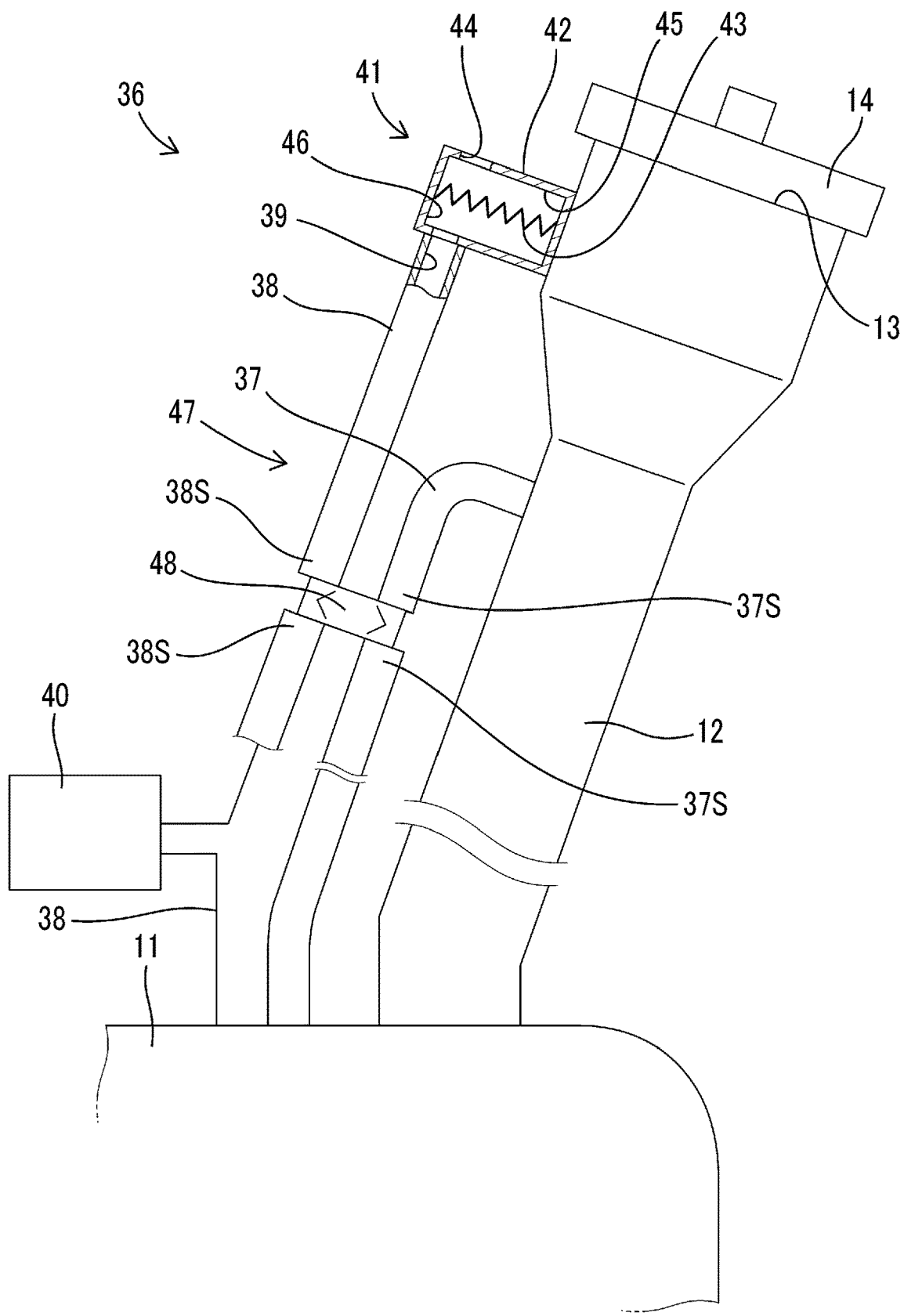
FIG. 4 is a front view of a fuel supply device according to Example 3.
Figure 5:
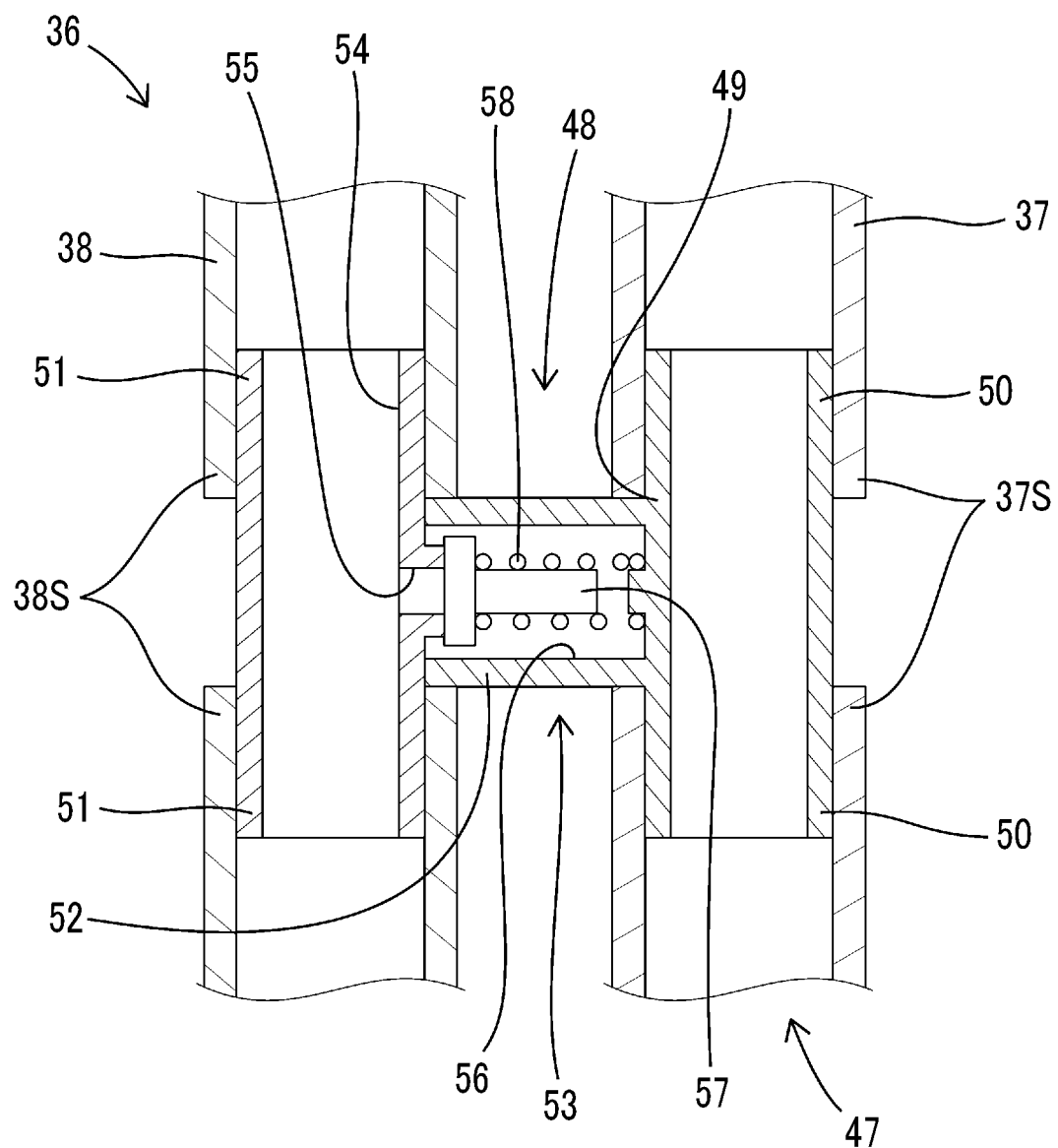
FIG. 5 is a sectional front view of a valve module.

Example 3 which is a specific example of the aspect of the disclosure will be described with reference to FIGS. 4 and 5. Regarding the vertical direction, directions in FIGS. 4 and 5 will be referred to as upward and downward directions in the following description. Regarding the horizontal direction, directions in FIGS. 4 and 5 will be referred to as rightward and leftward directions.

A fuel supply device 36 in Example 3 is provided with the fuel tank 11, the inlet pipe 12 for supplying fuel to the fuel tank 11, the fuel cap 14 that opens and closes the oil supply port 13 of the inlet pipe 12, a breather pipe 37 through which air in the fuel tank 11 is discharged to the outside while oil is being supplied, a canister pipe 38, a filter unit 41, and a valve unit 48. In a state where die fuel cap 14 is attached to the inlet pipe 12, the oil supply port 13 is air-tightly closed.

A lower end portion of the inlet pipe 12 (downstream side end of oil supply path) is connected to the fuel tank 11 such that the lower end portion communicates with the fuel tank 11. An upper end portion of the breather pipe 37 is connected to a portion of the inlet pipe 12 that is positioned slightly below the oil supply port 13 (positioned downstream of oil supply port 13 in oil supply path) such that the upper end portion communicates with the inlet pipe 12. The lower end portion of the breather pipe 37 is connected to the fuel tank 11 such that the lower end portion communicates with the fuel tank 11.

A canister 40 is provided in the middle of the canister pipe 38 and a lower end portion of the canister pipe 38 is connected to the fuel tank 11. Fuel vapor that is generated in the fuel tank 11 while oil is being supplied is adsorbed by activated carbon in the canister 40 so that clean air is discharged to the atmosphere through the canister pipe 38 and the filter unit 41. When the fuel vapor adsorbed in the canister 40 is released through a negative-pressure purging process of an engine (not shown), the pressure in the canister 40 becomes a negative pressure so that the outside air is taken into the canister 40 through the filter unit 41 and the canister pipe 38.

An upper end portion of the canister pipe 38 is positioned in the vicinity of the upper end portion of the inlet pipe 12. The upper end portion of the canister pipe 38 is formed as a communication port 39 and the filter unit 41 is attached to the communication port 39. The filter unit 41 is configured with a filter housing 42 and an air filter 43 that is accommodated in the filter housing 42. The filter housing 42 is attached to the outer circumference of the upper end portion of the inlet pipe 12 (in vicinity of oil supply port 13).

The inside of the filter housing 42 is vertically partitioned by the air filter 43. The air filter 43 allows air to pass through the air filter 43 while the air filter 43 inhibits the dust in the air from passing through the air filter 43. A space above the air filter 43 in the filter housing 42 is an introducing chamber 45 that communicates with the atmosphere via an introducing port 44. A space below the air filter 43 in the filter housing 42 is a clean chamber 46 that communicates with the communication port 39 of the canister pipe 38.

A portion of the breather pipe 37 and a portion of the canister pipe 38 are routed to be substantially parallel to each other and to be close to each other and an intermediate portion of each of the breather pipe 37 and the canister pipe 38 is divided into parts at a space where the portion of the breather pipe 37 and the portion of the canister pipe 38 are routed to be substantially parallel to each other. The valve unit 48 is attached to divided portions 37S of the breather pipe 37 and divided portions 38S of the canister pipe 38. The breather pipe 37 and the canister pipe 38 are connected to each other such that the divided portions 37S of the breather pipe 37 and the divided portions 38S of the canister pipe 38 can communicate with each other via the valve unit 48.

The internal space of the filter unit 41, an area from the communication port 39 of the canister pipe 38 to a connection portion between the canister pipe 38 and the valve unit 48, the internal space of the valve unit 48, and an area from a communication portion between the breather pipe 37 and the valve unit 48 to a communication portion (connection portion) between the breather pipe 37 and the fuel tank 11 constitute an air flow path 47. The air flow path 47 is an inflow path for causing air in the atmosphere to flow into the fuel tank 11 in a case where the pressure in the fuel tank 11 becomes a negative pressure (becomes lower than atmospheric pressure).

The valve unit 48 is obtained by accommodating a normally closed negative pressure valve 53 in a valve housing 49. The valve housing 49 is obtained by assembling and combining a plurality of members. The valve housing 49 is configured with a breather side cylindrical connection portion 50 to be connected to the breather pipe 37, a canister side cylindrical connection portion 51 to be connected to the canister pipe 38, and a cylindrical connection portion 52 through which the breather side cylindrical connection portion 50 and the canister side cylindrical connection portion 51 communicate with each other.

Upper and lower end portions of the breather side cylindrical connection portion 50 that protrude upward and downward from the cylindrical connection portion 52 are air-tightly fixed in a state of being internally fitted into the divided portions 37S of the breather pipe 37. Therefore, the divided portions 37S of the breather pipe 37 are connected to each other in a row via the breather side cylindrical connection portion 50. The breather side cylindrical connection portion 50 constitutes the breather pipe 37 and the air flow path 47.

Upper and lower end portions of the canister side cylindrical connection portion 51 that protrude upward and downward from the cylindrical connection portion 52 are air-tightly fixed in a state of being internally fitted into the divided portions 38S of the canister pipe 38. Therefore, the divided portions 38S of the canister pipe 38 are connected to each other in a row via the canister side cylindrical connection portion 51. The canister side cylindrical connection portion 51 constitutes the canister pipe 38 and the air flow path 47. The inside of the canister side cylindrical connection portion 51 functions as a primary chamber 54 of the negative pressure valve 53. A valve port 55 that penetrates the canister side cylindrical connection portion 51 in a direction from an inner circumference to an outer circumference of the canister side cylindrical connection portion 51 is formed in an area in the canister side cylindrical connection portion 51 that is aligned with the cylindrical connection portion 52.

The cylindrical connection portion 52 is integrally formed with the breather side cylindrical connection portion 50 and protrudes toward the canister side cylindrical connection portion 51 from an outer circumference of the breather side cylindrical connection portion 50. A protruding end portion of the cylindrical connection portion 52 is air-tightly fixed to the outer circumference of the canister side cylindrical connection portion 51. The internal space of the cylindrical connection portion 52 communicates with the breather side cylindrical connection portion 50 and functions as a secondary chamber 56 of the negative pressure valve 53. The secondary chamber 56 constitutes the air flow path 47. In the secondary chamber 56 (in cylindrical connection portion 52), a valve body 57 for opening and closing the valve port 55 and a spring member 58 that urges the valve body 57 in a valve closing direction are accommodated.

In a usual state, the valve body 57 air-tightly closes the valve port 55 due to an urging force of the spring member 58 so that the negative pressure valve 53 is maintained in a closed slate in which the primary chamber 54 and the secondary chamber 56 are air-tightly isolated from each other. When the pressure in the secondary chamber 56 (in fuel tank 11) becomes lower than the pressure in the primary chamber 54, the valve body 57 moves against the urging force of the spring member 58 in a direction such that the valve port 55 is opened. Therefore, the primary chamber 54 and the secondary chamber 56 communicate with each other and the negative pressure valve 53 enters an opened state. When the negative pressure valve 53 enters the opened state, air in the atmosphere is introduced into the introducing chamber 45 of the filter housing 42 via the introducing port 44 and passes through the air filter 43. Then, the air flows into the fuel tank 11 after sequentially passing through the clean chamber 46, the canister pipe 38, the primary chamber 54, the valve port 55, the secondary chamber 56, and the breather pipe 37.

Although the dust Hooting in the atmosphere (air) also flows into the filter housing 42 when the negative pressure valve 53 is opened, the dust in air is captured by the air filter 43 during a process of passing through the air filter 43. Therefore, clean air mixed with substantially no dust flows into the clean chamber 46. Accordingly, there is no possibility that the dust is caught between an opening edge of the valve port 55 and the valve body 57 when the negative pressure valve 53 is closed.

The fuel supply device 36 according to Example 3 includes the inlet pipe 12 configured such that the first end of the inlet pipe 12 is connected to an oil supply port 13 and the second end of the inlet pipe 12 is connected to the fuel tank 11 and the air flow path 47 configured such that an upstream side end of the air flow path 47 is open to the outside and a downstream side end of the air flow path 47 is connected to the fuel tank 11. The air flow path 47 includes the negative pressure valve 53 configured such that the valve body is moved and the valve port is opened when the pressure in the fuel tank 31 becomes a negative pressure and the air filter 43 disposed upstream of the valve port 55 (secondary chamber 56) of the negative pressure valve 53.

In the case of the above-described configuration, air in the atmosphere flows into the fuel tank 11 alter sequentially passing through the air filter 43 and the negative pressure valve 53 when the negative pressure valve 53 is opened. However, the dust in the atmosphere does not reach the negative pressure valve 53 since the dust cannot pass through the air filter 43. Therefore, it is possible to prevent a malfunction of the negative pressure valve 53 that occurs when the dust in the atmosphere is caught.

The fuel supply device 36 according to Example 3 includes the breather pipe 37 that is configured to connect a portion of the inlet pipe 12 that is downstream of the oil supply port 13 and is in the vicinity of the oil supply port 13 and the fuel tank 11 to each other and the canister pipe 38 that is disposed to be parallel to the breather pipe 37 and is configured such that a first end of the canister pipe 38 is open to the outside and a second end of the canister pipe 38 is connected to the canister 40. In addition, the valve unit 48 provided with the negative pressure valve 53 is provided such that the valve unit 48 connects the breather pipe 37 and the canister pipe 38 to each other. In the case of the above-described configuration, the breather pipe 37 and the canister pipe 38 are integrated with each other via the negative pressure valve 53 (valve unit 48). Therefore, vibration of the breather pipe 37 and the canister pipe 38 during (raveling is further suppressed.

Example 4

Figure 6:
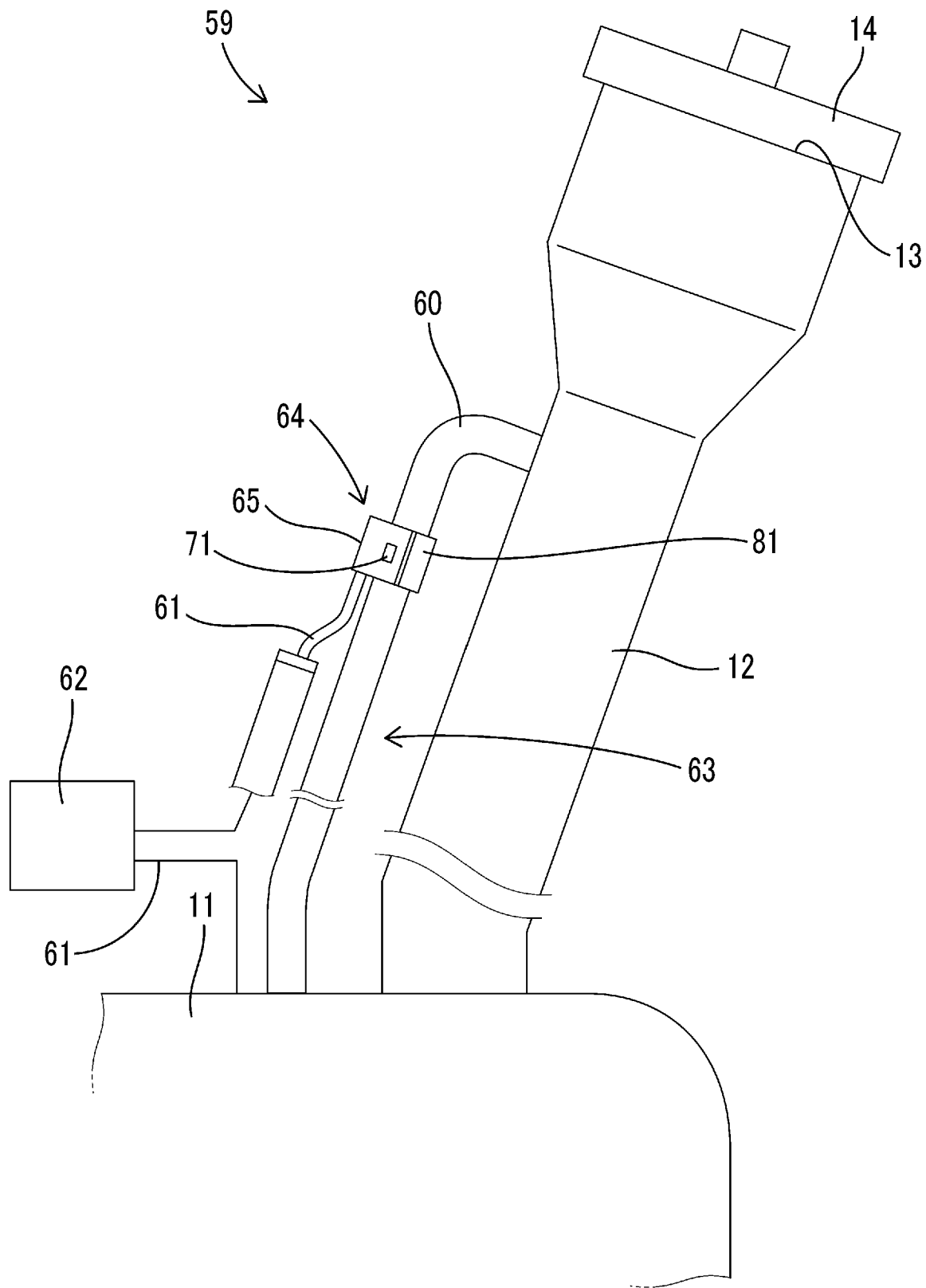
FIG. 6 is a front view of a fuel supply device according to Example 4.
Figure 7:
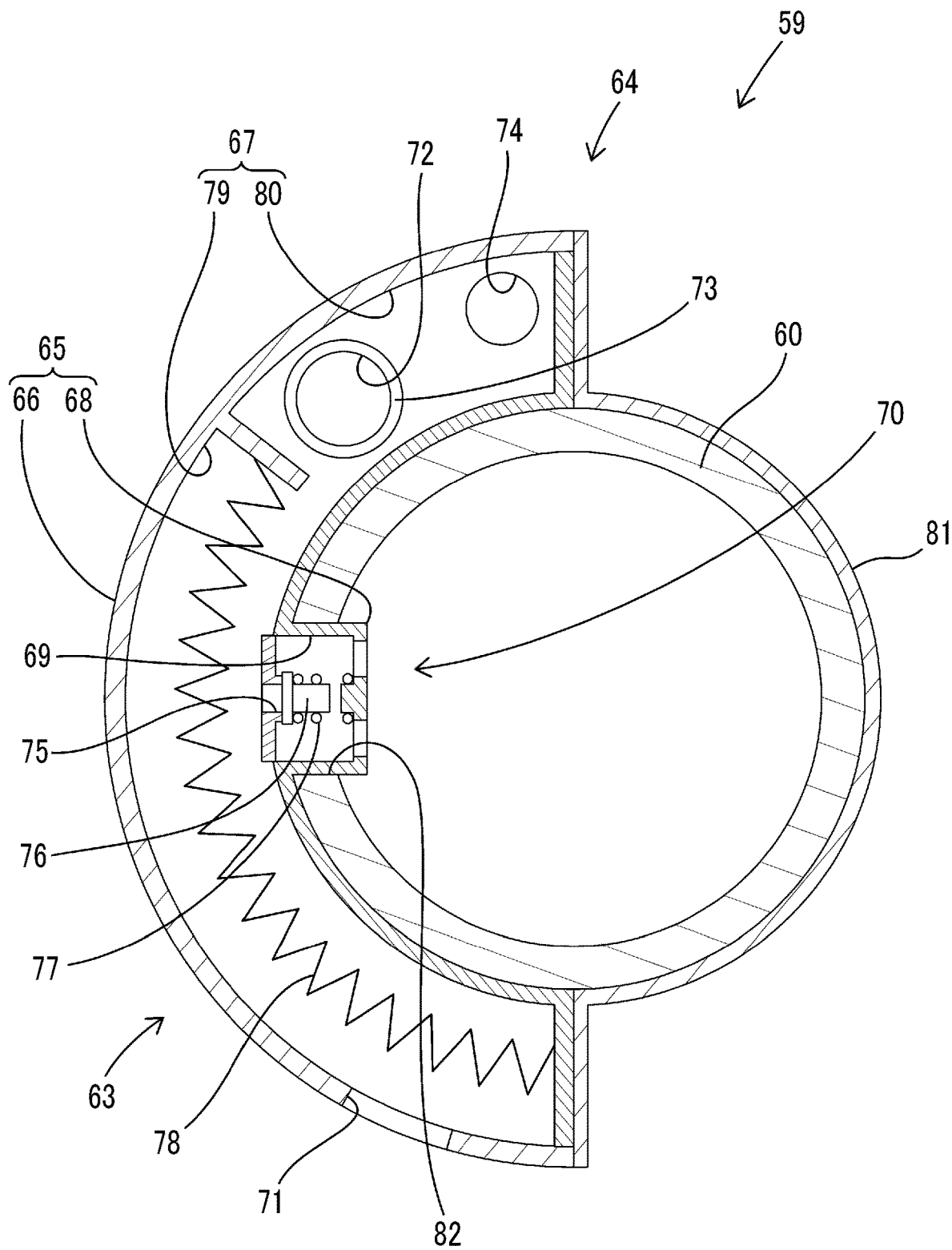
FIG. 7 is a sectional plan view of a valve module.

Hereinafter, Example 4 which is a specific example of the aspect of the disclosure will be described with reference to FIGS. 6 and 7. Regarding the vertical direction, directions in FIG. 6 will be referred to as upward and downward directions in the following description.

A fuel supply device 59 in Example 4 is provided with the fuel tank 11, the inlet pipe 12 for supplying fuel to the fuel tank 11, the fuel cap 14 that opens and closes the oil supply port 13 of the inlet pipe 12, a breather pipe 60 through which air in the fuel tank 11 is discharged to the outside while oil is being supplied, a canister pipe 61, and a valve module 64. In a state where the fuel cap 14 is attached to the inlet pipe 12, the oil supply port 13 is air-tightly closed.

A lower end portion of the inlet pipe 12 (downstream side end of oil supply path) is connected to the fuel tank 11 such that the lower end portion communicates with the fuel tank 11. An upper end portion of the breather pipe 60 is connected to a portion of the inlet pipe 12 that is positioned slightly below the oil supply port 13 (positioned downstream of oil supply port 13 in oil supply path) such that the upper end portion communicates with the inlet pipe 12. The lower end portion of the breather pipe 60 is connected to the fuel tank 11 such that the lower end portion communicates with the fuel tank 11.

The valve module 64 is attached to the breather pipe 60. The valve module 64 and an area from the valve module 64 of the breather pipe 60 to the fuel tank 11 constitute an air flow path 63 for causing air in the atmosphere to flow into the fuel tank 11 in a case where the pressure in the fuel tank 11 becomes a negative pressure (becomes lower than atmospheric pressure). An upper end portion of the canister pipe 61 is connected to a lower surface of the valve module 64.

The valve module 64 is configured to include a housing 65, a normally closed negative pressure valve 70, an air filter 78, and an attachment member 81. The negative pressure valve 70 and the air filter 78 are integrated with the housing 65. The housing 65 is configured to include a primary side casing 66 in which a primary chamber 67 of the negative pressure valve 70 is formed and a secondary side casing 68 in which a secondary chamber 69 of the negative pressure valve 70 is formed. The shape of the primary side casing 66 as seen in a plan view is an approximate semi-arc shape. The radius of curvature of an inner circumference of the approximate semi-arc shape is equal to the outer diameter of the breather pipe 60. The secondary side casing 68 protrudes from an inner circumference of the primary side casing 66.

The housing 65 is fixed to the breather pipe 60 by the plate-shaped attachment member 81 that has an approximate semi-arc shape as seen in a plan view. In a state where the housing 65 is fixed to the breather pipe 60, the primary side casing 66 and the attachment member 81 are in close-contact with an outer circumference of the breather pipe 60 and the breather pipe 60 is interposed between the primary side casing 66 and the attachment member 81 in a radial direction. In addition, opposite end portions of the primary side casing 66 and the attachment member 81 in a circumferential direction are fixed to each other by a fastening member (not shown) such as a bolt and a nut. The secondary side casing 68 is air-tightly fitted into an attachment hole 82 that is formed in the breather pipe 60 such that the attachment hole 82 penetrates the breather pipe 60 and the secondary side casing 68 faces the inside of the breather pipe 60.

The primary chamber 67 and the secondary chamber 69 constitute the air flow path 63 along with the breather pipe 60. An introducing port 71 that penetrates a first circumferential end portion of an outer circumferential wall portion of the primary side casing 66 such that the primary chamber 67 communicates with the atmosphere is formed in the primary side casing 66. A communication port 72 and a water drain port 74 are formed in a second circumferential end portion of a lower wall portion of the primary side casing 66 such that the communication port 72 and the water drain port 74 penetrate the second circumferential end portion. A retaining wall portion 73 that protrudes toward the primary chamber 67 side (upper side) is formed over the entire circumference of an opening edge of the communication port 72.

An upper end portion of the canister pipe 61 is air-tightly connected to the communication port 72. A canister 62 is provided in the middle of the canister pipe 61. A lower end portion of the canister pipe 61 is connected to the fuel tank 11. Fuel vapor that is generated in the fuel tank 11 while oil is being supplied is adsorbed by activated carbon in the canister 62 so that clean air is discharged to the atmosphere through the canister pipe 61 and the introducing port 71 of the valve module 64. When the fuel vapor adsorbed in the canister 62 is released through a negative-pressure purging process of an engine (not shown), the pressure in the canister 62 becomes a negative pressure so that the outside air is taken into the canister 62 via the introducing port 71 after passing through the valve module 64 and the canister pipe 61.

A valve port 75 for causing the primary chamber 67 and the secondary chamber 69 to communicate with each other is formed in an inner circumferential wall portion of the primary side casing 66. In the secondary chamber 69, a valve body 76 for opening and closing the valve port 75 and a spring member 77 that urges the valve body 76 in a valve closing direction are accommodated. The secondary chamber 69 communicates with the breather pipe 60. In a usual state, the valve body 76 air-tightly closes the valve port 75 due to an urging force of the spring member 77 so that the negative pressure valve 70 is maintained in a closed state in which the primary chamber 67 and the secondary chamber 69 are air-tightly isolated from each other.

When the pressure in the secondary chamber 69 (in fuel tank 11) becomes lower than the pressure in the primary chamber 67, the valve body 76 moves against the urging force of the spring member 77 in a direction such that the valve port 75 is opened. Therefore, the primary chamber 67 and the secondary chamber 69 communicate with each other and the negative pressure valve 70 enters an opened state. When the negative pressure valve 70 enters the opened state, air in the atmosphere is introduced into the primary chamber 67 via the introducing port 71 and the air flows into the fuel tank 11 after sequentially passing through the valve port 75, the secondary chamber 69, and the breather pipe 60.

Since dust floats in the atmosphere (air), when the negative pressure valve 70 is opened, the dust flows into the primary chamber 67 along with the air. In a case where the dust adheres to the valve port 75 or the valve body 76 of the negative pressure valve 70, the negative pressure valve 70 may not be fully closed because the dust is caught between an opening edge of the valve port 75 and the valve body 76 when the negative pressure valve 70 is closed.

As a countermeasure for the above-described problem, the primary chamber 67 in the fuel supply device 59 according to Example 4 is partitioned into an inner circumferential space and an outer circumferential space by the bellows-shaped air filter 78 that is disposed in the circumferential direction. The air filter 78 allows the atmospheric air (air) to pass through the air filter 78 while the air filler 78 inhibits the dust in the atmosphere from passing through the air filter 78. A space in the primary chamber 67 that is positioned radially outward of the air filter 78 (space that is upstream of air filter 78 in air flow path 63) is an introducing chamber 79 that is open to the atmosphere at the introducing port 71. A spare in the primary chamber 67 that is positioned radially inward of the air filter 78 (space that is downstream of air filter 78 in air flow path 63) is a clean chamber 80 that can communicate with the secondary chamber 69 via the valve port 75.

The dust in the air is captured by the air filter 78 during a process in which the pressure in the fuel tank 11 becomes a negative pressure, the negative pressure valve 70 is opened, and air flowing into the introducing chamber 79 (primary chamber 67) via the introducing port 71 passes through the air filter 78. Therefore, clean air mixed with substantially no dust flows into the clean chamber 80. Accordingly, there is no possibility that the dust is caught between the opening edge of the valve port 75 and the valve body 76 when the negative pressure valve 70 is closed.

The fuel supply device 59 according to Example 4 includes the inlet pipe 12 configured such that a first end of the inlet pipe 12 is connected to the oil supply port 13 and a second end of the inlet pipe 12 is connected to the fuel tank 11 and the air flow path 63 configured such that an upstream side end of the air flow path 63 is open to the outside and a downstream side end of the air flow path 63 is connected to the fuel tank 11. The air flow path 63 includes the negative pressure valve 70 configured such that the valve body is moved and the valve port is opened when the pressure in the fuel tank 11 becomes a negative pressure and the air filter 78 disposed upstream of the valve port 75 (secondary chamber 69) of the negative pressure valve 70.

In the case of the above-described configuration, air in the atmosphere flows into the fuel tank 11 after sequentially passing through the air filter 78 and the negative pressure valve 70 when the negative pressure valve 70 is opened. However, the dust in the atmosphere does not reach the negative pressure valve 70 since the dust cannot pass through the air filter 78. Therefore, it is possible to prevent a malfunction of the negative pressure valve 70 that occurs when the dust in the atmosphere is caught.

The negative pressure valve 70 and the air filter 78 are integrated with each other via the housing 65 and constitute the valve module 64. The valve module 64 is detachable from the breather pipe 60 that constitutes the air flow path 63. Therefore, at the time of maintenance of the air filter 78 or the negative pressure valve 70, it is possible to detach the housing 65 of the valve module 64 from the breather pipe 60 by loosening the fastening member. Since the housing 65 is obtained by assembling and combining a plurality of members, the air filter 78 or the negative pressure valve 70 can be detached when the housing 65 is disassembled. Therefore, the workability at the time of maintenance is favorable.

The negative pressure valve 70 is provided such that air flows into a space positioned radially inward of the breather pipe 60 from a space positioned radially outward of the breather pipe 60 (primary chamber 67) via the secondary chamber 69. The air filter 78 is disposed in an approximate arc shape to cover the outer circumference of the breather pipe 60 and the negative pressure valve 70. In the case of the above-described configuration, it is possible to achieve space-saving in comparison with a case where the negative pressure valve 70 and the air filter 78 are provided to protrude in the radial direction from the outer circumference of the breather pipe 60.

Example 5

Figure 8:
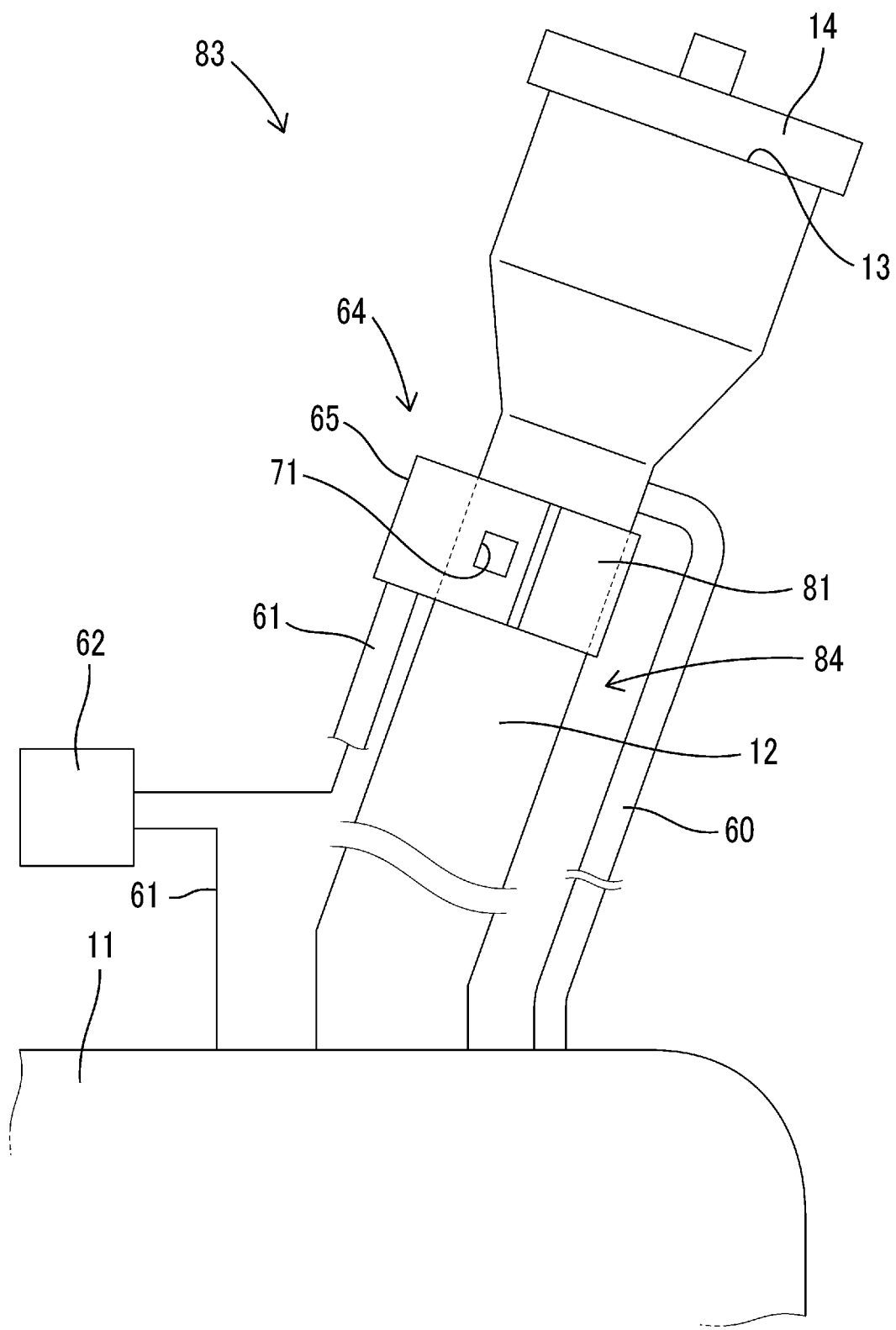
FIG. 8 is a front view of a fuel supply device according to Example 5.
Figure 9:
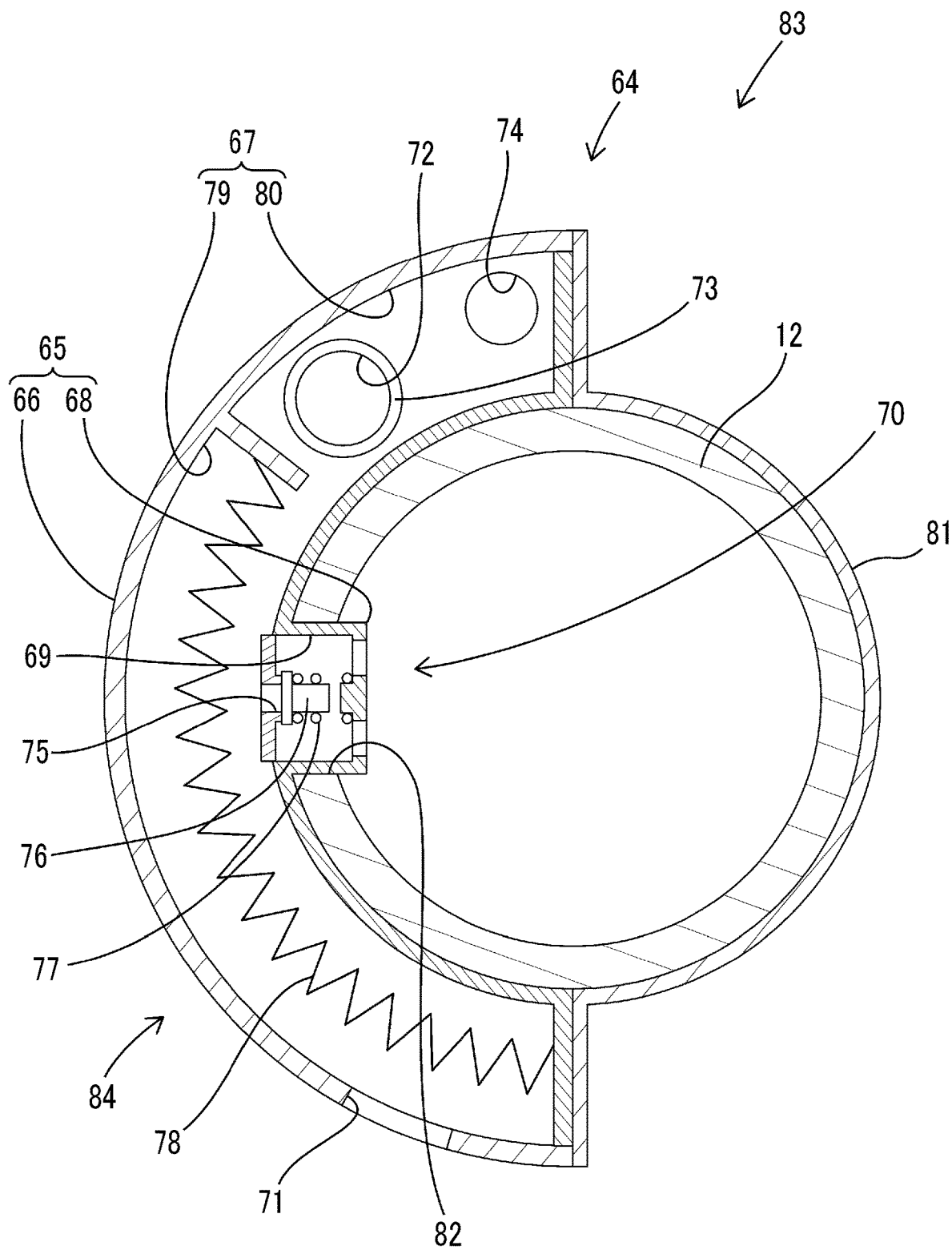
FIG. 9 is a sectional plan view of a valve module.

Example 5 which is a specific example of the aspect of the disclosure will be described with reference to FIGS. 8 and 9. Regarding the vertical direction, directions in FIG. 8 will be referred to as upward and downward directions in the following description.

A fuel supply device 83 in Example 5 is provided with the fuel tank 11, the inlet pipe 12 for supplying fuel to the fuel tank 11, the fuel cap 14 that opens and closes the oil supply port 13 of the inlet pipe 12, the breather pipe 60 through which air in the fuel tank 11 is discharged to the outside while oil is being supplied, the canister pipe 61, and the valve module 64. In a state where the fuel cap 14 is attached to the inlet pipe 12, the oil supply port 13 is air-tightly closed.

A lower end portion of the islet pipe 12 (downstream side end of oil supply path) is connected to the fuel tank 11 such that the lower end portion communicates with the fuel tank 11. An upper end portion of the breather pipe 60 is connected to a portion of the inlet pipe 12 that is positioned slightly below the oil supply port 13 (positioned downstream of oil supply port 13 in oil supply path) such that the upper end portion communicates with the inlet pipe 12. The lower end portion of the breather pipe 60 is connected to the fuel tank 11 such that the lower end portion communicates with the fuel tank 11.

In Example 4, the valve module 64 is attached to the breather pipe 60. However, in Example 5, the valve module 64 having the same configuration as that in Example 4 is attached to the inlet pipe 12. An upper end portion of the canister pipe 61 is connected to a lower surface of the valve module 64. The valve module 64 and an area from the valve module 64 of the inlet pipe 12 to the fuel tank 11 constitute an air flow path 84 for causing air in the atmosphere to flow into the fuel tank 11 in a case where the pressure in the fuel tank 11 becomes a negative pressure (becomes lower than atmospheric pressure).

The valve module 64 is configured to include the housing 65, the normally closed negative pressure valve 70, the air filter 78, and the attachment member 81. The negative pressure valve 70 and the air filter 78 are integrated with the housing 65. The housing 65 is configured to include the primary side casing 66 in which the primary chamber 67 of the negative pressure valve 70 is formed and the secondary side casing 68 in which the secondary chamber 69 of the negative pressure valve 70 is formed. The shape of the primary side casing 66 as seen in a plan view is an approximate semi-arc shape. The radius of curvature of an inner circumference of the approximate semi-arc shape is equal to the outer diameter of the inlet pipe 12. The secondary side casing 68 protrudes from the inner circumference of the primary side casing 66.

The housing 65 is fixed to the inlet pipe 12 by the plate-shaped attachment member 81 that has an approximate semi-arc shape as seen in a plan view. In a state where the housing 65 is fixed to the inlet pipe 12, the primary side casing 66 and the attachment member 81 are in close-contact with the outer circumference of the inlet pipe 12 and the inlet pipe 12 is interposed between the primary side casing 66 and the attachment member 81 in the radial direction. In addition, opposite end portions of the primary side casing 66 and the attachment member 81 in the circumferential direction are fixed to each other by a fastening member (not shown) such as a bolt and a nut. The secondary side casing 68 is air-tightly fitted into the attachment hole 82 that is formed in the inlet pipe 12 such that the attachment hole 82 penetrates the inlet pipe 12 and the secondary side casing 68 faces the inside of the inlet pipe 12.

The primary chamber 67 and the secondary chamber 69 constitute the air flow path 84 along with the inlet pipe 12. The introducing port 71 that penetrates the first circumferential end portion of the outer circumferential wall portion of the primary side casing 66 such that the primary chamber 67 communicates with the atmosphere is formed in the primary side casing 66. The communication port 72 and the water drain port 74 are formed in the second circumferential end portion of the lower wall portion of the primary side casing 66 such that the communication port 72 and the water drain port 74 penetrate the second circumferential end portion. The retaining wall portion 73 that protrudes toward the primary chamber 67 side (upper side) is formed over the entire circumference of the opening edge of the communication port 72.

The upper end portion of the canister pipe 61 is air-tightly connected to me communication port 72. The canister 62 is provided in the middle of the canister pipe 61. The lower end portion of the canister pipe 61 is connected to the fuel tank 11. Fuel vapor that is generated in the fuel tank 11 while oil is being supplied is adsorbed by activated carbon in the canister 62 so that clean air is discharged to the atmosphere through the canister pipe 61 and the introducing port 71 of the valve module 64. When the fuel vapor adsorbed in the canister 62 is released through a negative-pressure purging process of an engine (not shown), the pressure in the canister 62 becomes a negative pressure so that the outside air is taken into the canister 62 via the introducing port 7 after passing through the valve module 64 and the canister pipe 61.

The valve port 75 for causing the primary chamber 67 and the secondary chamber 69 to communicate with each other is formed in the inner circumferential wall portion of the primary side casing 66. In the secondary chamber 69, the valve body 76 for opening and closing the valve port 75 and the spring member 77 that urges the valve body 76 in the valve closing direction are accommodated. The secondary chamber 69 communicates with the inlet pipe 12. In a usual state, the valve body 76 air-lightly closes the valve port 75 due to an urging force of the spring member 77 so that the negative pressure valve 70 is maintained in a closed state in which the primary chamber 67 and the secondary chamber 69 are air-tightly isolated from each other.

When the pressure in the secondary chamber 69 (in fuel tank 11) becomes lower than the pressure in the primary chamber 67, the valve body 76 moves against the urging force of the spring member 77 in a direction such that the valve port 75 is opened. Therefore, the primary chamber 67 and the secondary chamber 69 communicate with each other and the negative pressure valve 70 enters an opened state. When the negative pressure valve 70 enters the opened state, air in the atmosphere is introduced into the primary chamber 67 via the introducing port 71 and the air flows into the fuel tank 11 after sequentially passing through the valve port 75, the secondary chamber 69, and the inlet pipe 12.

Since dust floats in the atmosphere (air), when the negative pressure valve 70 is opened, the dust flows into the primary chamber 67 along with the air. In a case where the dust adheres to the valve port 75 or the valve body 76 of the negative pressure valve 70, the negative pressure valve 70 may not be fully closed because the dust is caught between an opening edge of the valve port 75 and the valve body 76 when the negative pressure valve 70 is closed.

As a countermeasure for the above-described problem, the primary chamber 67 in the fuel supply device 83 according to Example 5 is partitioned into an inner circumferential space and an outer circumferential space by the bellows-shaped air filter 78 that is disposed in the circumferential direction. The air filter 78 allows the atmospheric air (air) to pass through the air filter 78 while the air filter 78 inhibits the dust in the atmosphere from passing through the air filter 78. A space in the primary chamber 67 that is positioned radially outward of the air filter 78 (space that is upstream of air filter 78 in air flow path 84) is the introducing chamber 79 that is open to the atmosphere at the introducing port 71. A space in the primary chamber 67 that is positioned radially inward of the air filter 78 (space that is downstream of air filter 78 in air flow path 84) is the clean chamber 80 that can communicate with the secondary chamber 69 via the valve port 75.

The dust in the air is captured by the air filter 78 during a process in which the pressure in the fuel tank 11 becomes a negative pressure, the negative pressure valve 70 is opened, and air flowing into the introducing chamber 79 (primary chamber 67) via the introducing port 71 passes through the air filter 78. Therefore, clean air mixed with substantially no dust flows into the clean chamber 80. Accordingly, there is no possibility that the dust is caught between the opening edge of the valve port 75 and the valve body 76 when the negative pressure valve 70 is closed.

The fuel supply device 83 according to Example 5 includes the inlet pipe 12 configured such that a first end of the inlet pipe 12 is connected to the oil supply port 13 and a second end of the inlet pipe 12 is connected to the fuel tank 11 and the air flow path 84 configured such that an upstream side end of the air flow path 84 is open to the outside and a downstream side end of the air flow path 84 is connected to the fuel tank 11. The air flow path 84 includes the negative pressure valve 70 configured such that the valve body is moved and the valve port is opened when the pressure in the fuel tank 11 becomes a negative pressure and the air filter 78 disposed upstream of the valve port 75 (secondary chamber 69) of the negative pressure valve 70.

In the case of the above-described configuration, air in the atmosphere flows into the fuel tank 11 after sequentially passing through the air filter 78 and the negative pressure valve 70 when the negative pressure valve 70 is opened. However, the dust in the atmosphere does not reach the negative pressure valve 70 since the dust cannot pass through the air filter 78. Therefore, it is possible to prevent a malfunction of the negative pressure valve 70 that that occurs when the dust in the atmosphere is caught.

The negative pressure valve 70 and the air filter 78 are integrated with each other via the housing 65 and constitute the valve module 64. The valve module 64 is detachable from the inlet pipe 12 that constitutes the air flow path 84. Therefore, at the time of maintenance of the air filter 78 or the negative pressure valve 70, it is possible to detach the housing 65 of the valve module 64 from the inlet pipe 12 by loosening the fastening member. Since the housing 65 is obtained by assembling and combining a plurality of members, the air filter 78 or the negative pressure valve 70 can be detached when the housing 65 is disassembled. Therefore, the workability at the time of maintenance is favorable.

The negative pressure valve 70 is provided such that air flows into a space positioned radially inward of the inlet pipe 12 from a space positioned radially outward of the inlet pipe 12 (primary chamber 67) via the secondary chamber 69. The air filter 78 is disposed in an approximate arc shape to cover the outer circumference of the inlet pipe 12 and the negative pressure valve 70. In the case of the above-described configuration, it is possible to achieve space-saving in comparison with a case where the negative pressure valve 70 and the air filter 78 are provided to protrude in the radial direction from the outer circumference of the inlet pipe 12.

Example 6

Figure 10:
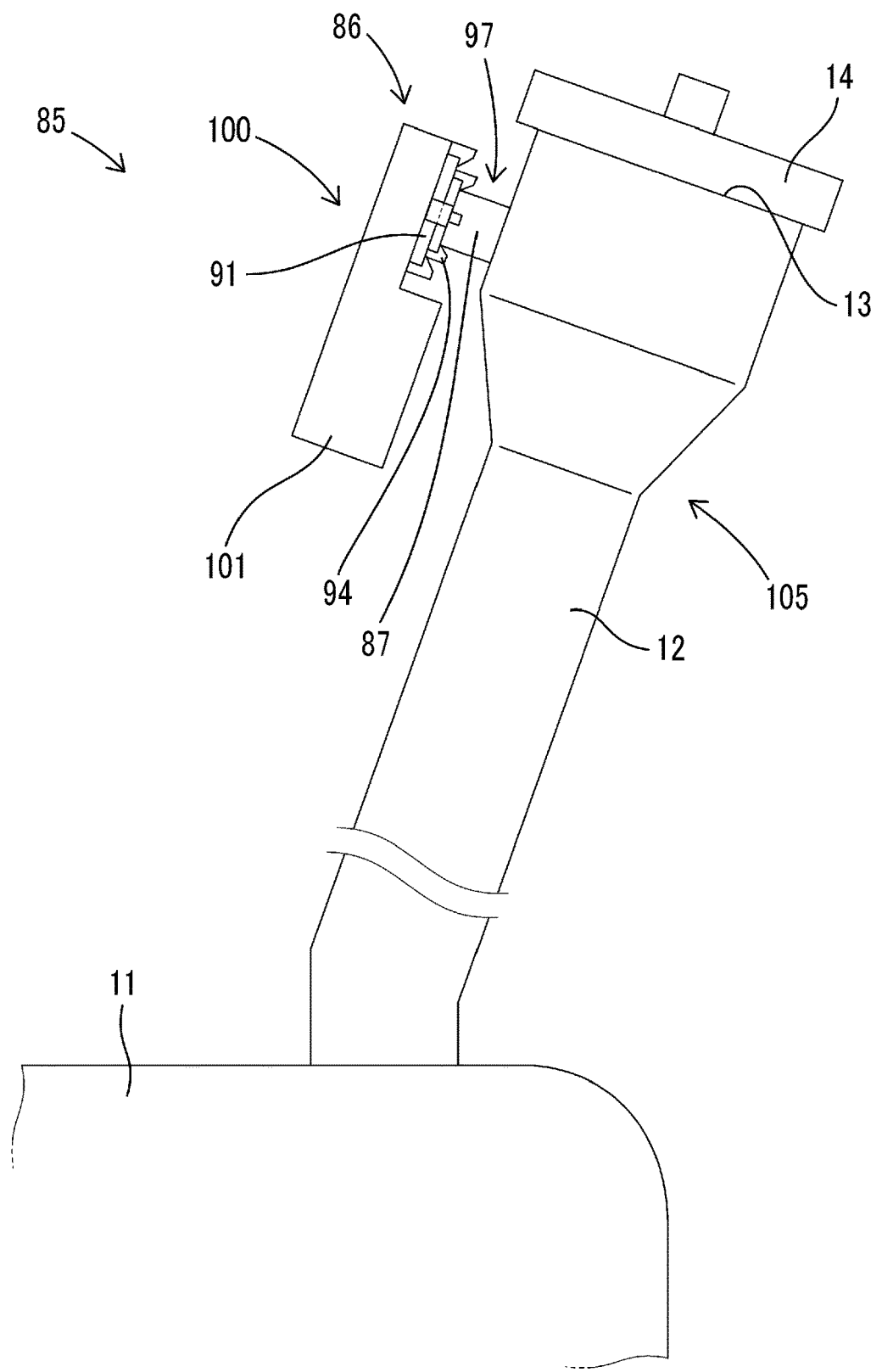
FIG. 10 is a front view of a fuel supply device according to Example 6.
Figure 11:
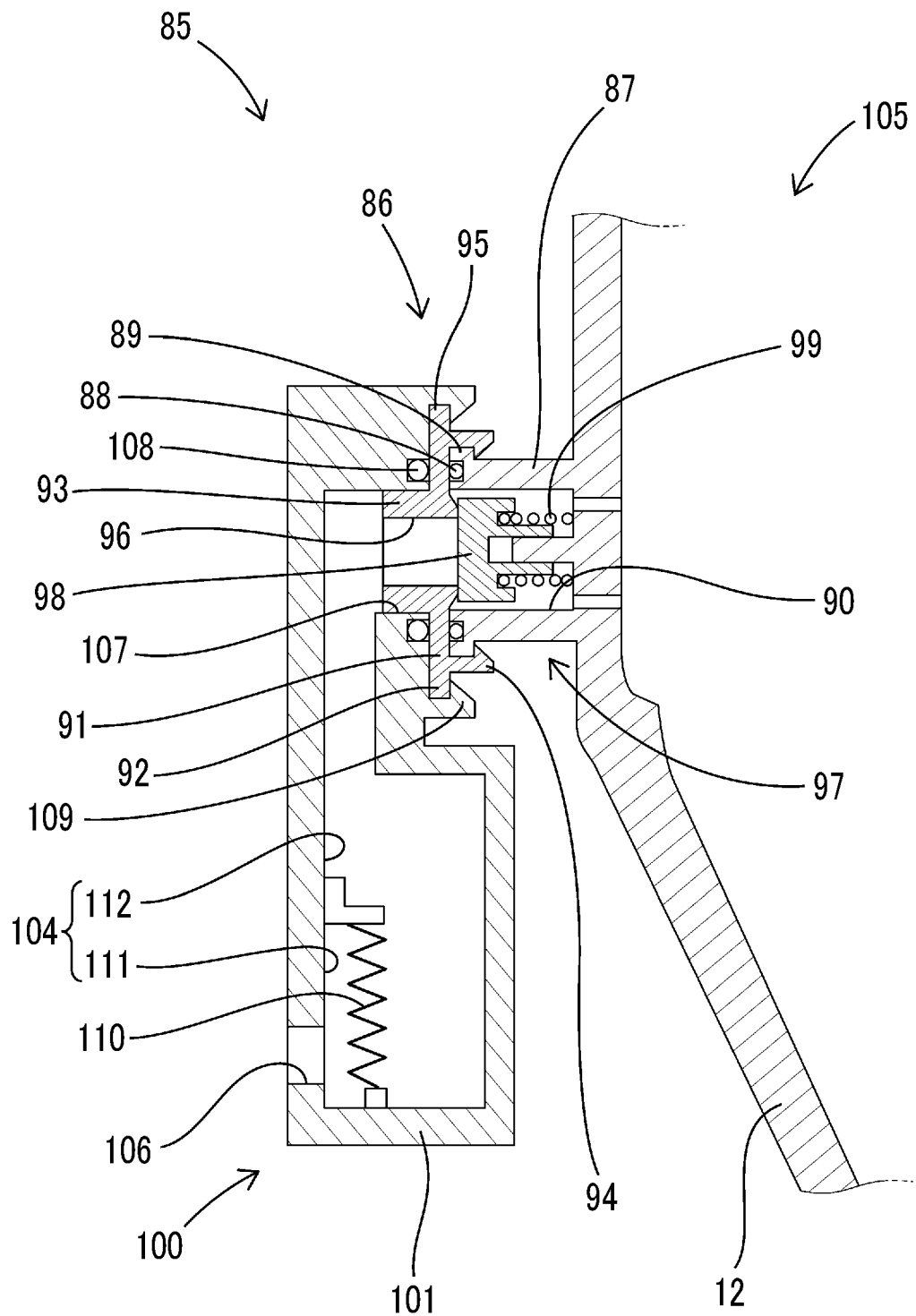
FIG. 11 is a sectional front view of a valve module.

Example 6 which is a specific example of the aspect of the disclosure will be described with reference to FIGS. 10 and 11. Regarding the vertical direction, directions in FIGS. 10 and 11 will be referred to as upward and downward directions in the following description. Regarding the horizontal direction, directions in FIGS. 10 and 11 will be referred to as rightward and leftward directions.

A fuel supply device 85 in Example 6 is provided with the fuel tank 11, the inlet pipe 12 for supplying fuel to the fuel tank 11, the fuel cap 14 that opens and closes the oil supply port 13 of the inlet pipe 12, a normally closed negative pressure valve 86, and a filter unit 100. A lower end portion of the inlet pipe 12 (downstream side end of oil supply path) is connected to the fuel tank 11 such that the lower end portion communicates with the fuel tank 11. In a state where the fuel cap 14 is attached to the inlet pipe 12, the oil supply port 13 is air-tightly closed.

A cylindrical portion 87 of which an axis is approximately parallel to the horizontal direction (direction approximately orthogonal to axis of upper end portion of inlet pipe 12) is formed to integrally protrude in a radially outward direction (leftward) on the outer circumference of an upstream side end portion (position near oil supply port 13) of the inlet pipe 12. The cylindrical portion 87 constitutes the negative pressure valve 86. A first seal ring 88 that air-tightly seals a gap between the cylindrical portion 87 and a valve cap 91 (which will be described later) is mounted onto a protruding end surface (left end surface) of the cylindrical portion 87. An engagement projection 89 is formed over the entire outer circumference of a protruding end portion of the cylindrical portion 87. The internal space of the cylindrical portion 87 is a secondary chamber 90 that communicates with the inside of the inlet pipe 12 (fuel inflow path).

The valve cap 91 constituting the negative pressure valve 86 is attached to the protruding end portion of the cylindrical portion 87. The valve cap 91 is a single component that includes an annular plate-shaped main body portion 92, a cylindrical fitting portion 93, and a plurality of elastic engagement pieces 94. An outer circumferential edge portion of the plate-shaped main body portion 92 functions as a flange-shaped locking portion 95. The cylindrical fitting portion 93 protrudes leftward from a hole edge of a central hole of the plate-shaped main body portion 92 such that the cylindrical fitting portion 93 becomes coaxial with the cylindrical portion 87. The central hole of the plate-shaped main body portion 92 and the internal space of the cylindrical fitting portion 93 function as a valve port 96 of the negative pressure valve 86. The elastic engagement pieces 94 protrude toward a side opposite to the cylindrical tilting portion 93 side (rightward) from the plate-shaped main body portion 92 in a cantilevered state and are disposed at intervals in the circumferential direction on a circumference coaxial with the valve port 96.

The valve cap 91 is attached to the cylindrical portion 87 with the plate-shaped main body portion 92 abutting onto the protruding end surface of the cylindrical portion 87 and the elastic engagement pieces 94 being engaged with the engagement projection 89 of the cylindrical portion 87. The valve cap 91 and the cylindrical portion 87 constitute a valve housing 97. It is possible to detach the valve cap 91 from the cylindrical portion 87 by elastically deforming the elastic engagement pieces 94 radially outward and releasing the elastic engagement pieces 94 from the engagement projection 89. In a state where the valve cap 91 is attached to the cylindrical portion 87, the outer circumference of the inlet pipe 12, the cylindrical portion 87, and the valve cap 91 constitute the secondary chamber 90. In the secondary chamber 90, a valve body 98 that opens and closes the valve port 96 and a spring member 99 that urges the valve body 98 in a valve closing direction are accommodated.

The filter unit 100 is obtained by accommodating an air filter 110 in a filter housing 101. The inside of the filter housing 101 is a primary chamber 304 that constitutes the negative pressure valve 86. The primary chamber 104, the secondary chamber 90, and an area from a portion of the inlet pipe 12 at which the inlet pipe 12 communicates with the cylindrical portion 87 to the fuel tank 11 constitute an air flow path 105 for causing air in the atmosphere to flow into the fuel lank 11 in a case where the pressure in the fuel tank 11 becomes a negative pressure (becomes lower than atmospheric pressure).

An introducing port 106 that penetrates an outer wall of the filter housing 101 and through which the primary chamber 104 and the atmosphere communicate with each other is formed in a lower end portion of the primary chamber 104 (upstream side end portion of air flow path 105). A fitting hole 107 that penetrates the outer wall of the filter housing 101 and through which the inside of the primary chamber 104 and the outside of the filter housing 101 communicate with each other is formed in an upper end portion of the primary chamber 104. A second seal ring 108 that air-tightly seals a gap between the filter housing 101 and the valve cap 91 is mounted onto an area on an outer surface of the filter housing 101 that coaxially surrounds the filling hole 107. On the outer surface of the filter housing 101, a plurality of elastic locking pieces 109 is formed to protrude in a cantilevered state. The elastic locking pieces 109 are disposed to coaxially surround the second seal ring 108.

When the filter unit 100 is attached to the valve housing 97 (position near oil supply port 13 of inlet pipe 12), the negative pressure valve 86 is configured. In a state where the filter housing 101 is attached to the valve housing 97, the fitting hole 107 is fitted onto the cylindrical tilting portion 93 and the area (upper end portion of right surface) on the outer surface of the filter housing 101 onto which the second seal ring 108 is mounted abuts onto the plate-shaped main body portion 92 of the valve cap 91. When the elastic locking pieces 109 are engaged with the locking portion 95, the filter unit 100 is locked with respect to the valve housing 97 in a state of being attached. It is possible to detach the filter unit 100 from the valve housing 97 by elastically deforming the elastic locking pieces 109 radially outward and releasing the elastic locking pieces 109 from the locking portion 95.

In a usual state, the valve body 98 air-tightly closes the valve port 96 due to an urging force of the spring member 99 so that the negative pressure valve 86 is maintained in a closed state in which the primary chamber 104 and the secondary chamber 90 are air-tightly isolated from each other. When the pressure in the secondary chamber 90 (in fuel tank 11) becomes lower than the pressure in the primary chamber 104, the valve body 98 moves against the urging force of the spring member 99 in a direction such that the valve port 96 is opened. Therefore, the primary chamber 104 and the secondary chamber 90 communicate with each other and the negative pressure valve 86 enters an opened state. When the negative pressure valve 86 enters the opened state, air in the atmosphere is introduced into the primary chamber 104 via the introducing port 106 and the air flows into the fuel tank 11 after sequentially passing through the valve port 96, the secondary chamber 90, and the air flow path 105 (inlet pipe 12).

Since dust floats in the atmosphere (air), when the negative pressure valve 86 is opened, the dust flows into the primary chamber 104 along with the air. In a case where the dust adheres to the valve port 96 or the valve body 98 of the negative pressure valve 86, the negative pressure valve 86 may not be fully closed because the dust is caught between an opening edge of the valve port 96 and the valve body 98 when the negative pressure valve 86 is closed.

As a countermeasure for the above-described problem, the inside of the primary chamber 104 in the fuel supply device 85 according to Example 6 is partitioned into two chambers of an introducing chamber 111 and a clean chamber 112 by the bellows-shaped air filter 110. The air filter 110 allows the atmospheric air (air) to pass through the air filter 110 while the air filter 110 inhibits the dust in the atmosphere from passing through the air filter 110. The introducing chamber 111 is open to the atmosphere at the introducing port 106. The clean chamber 112 communicates with the secondary chamber 90 via the valve port 96.

The dust in the air is captured by the air filter 110 during a process in which the pressure in the fuel tank 11 becomes a negative pressure, the negative pressure valve 86 is opened, and air flowing into the introducing chamber 111 (primary chamber 104) via the introducing port 106 passes through the air filter 110. Therefore, clean air mixed with substantially no dust flows into the clean chamber 112. Accordingly, there is no possibility that the dust is caught between the opening edge of the valve port 96 and the valve body 98 when the negative pressure valve 86 is closed.

The fuel supply device 85 according to Example 6 includes the inlet pipe 12 configured such that a first end of the inlet pipe 12 is connected to the oil supply port 13 and a second end of the inlet pipe 12 is connected to the fuel tank 11 and the air flow path 105 configured such that an upstream side end of the air flow path 105 is open to the outside and a downstream side end of the air flow path 105 is connected to the fuel tank 11. The air flow path 105 includes the negative pressure valve 86 configured such that the valve body is moved and the valve port is opened when the pressure in the fuel tank 11 becomes a negative pressure and the air filter 110 disposed upstream of the valve port 96 (secondary chamber 90) of the negative pressure valve 86.

In the case of the above-described configuration, air in the atmosphere flows into the fuel tank 11 after sequentially passing through the air tiller 110 and the negative pressure valve 86 when the negative pressure valve 86 is opened. However, the dust in the atmosphere does not reach the negative pressure valve 86 since the dust cannot pass through the air filter 110. Therefore, it is possible to prevent a malfunction of the negative pressure valve 86 that occurs when the dust in the atmosphere is caught.

The fuel supply device 85 includes the valve housing 97 and the filter unit 100. The secondary chamber 90 constituting the negative pressure valve 86 is formed in the valve housing 97 and the valve body 98 that opens and closes the valve port 96 is accommodated in the secondary chamber 90. The primary chamber 104 constituting the negative pressure valve 86 is formed in the filter unit 100 and the inside of the primary chamber 104 is partitioned into the introducing chamber 111 communicating with the atmosphere and the clean chamber 112 facing the valve port 96 by the air filter 110. The filter unit 100 is detachable from the valve housing 97.

Specifically, when detaching the filter housing 101 from the valve housing 97, what has to be done is to elastic-ally deform the elastic locking pieces 109 of the filter housing 101 and releasing the elastic locking pieces 109 from the locking portion 95 of the valve housing 97. In this case, the filter unit 100 is replaceable. Therefore, the workability at the time of maintenance of the air filter 110 is favorable.

The valve housing 97 is configured by assembling the cylindrical portion 87 that accommodates the valve body 98 and the spring member 99 and the valve cap 91 that closes an opening portion of the cylindrical portion 87. It is possible to detach the valve cap 91 from the cylindrical portion 87 by elastically deforming the elastic engagement pieces 94 of the valve cap 91 and releasing the elastic engagement pieces 94 from the engagement projection 89 of the cylindrical portion 87. When the valve cap 91 is detached from the cylindrical portion 87, it becomes possible to clean or replace the valve body 98 and the spring member 99.

Therefore, the workability at the time of maintenance of the negative pressure valve 86 is also favorable.

The negative pressure valve 86 includes the cylindrical portion 87 that accommodates the valve body 98 and the cylindrical portion 87 integrally protrudes in the radial direction from the outer circumference (circumferential surface) of the inlet pipe 12. In the case of the above-described configuration, the number of components can be reduced in comparison with a case where the cylindrical portion 87 and the inlet pipe 12 are provided separately from each other.

Other Examples

For example, the following examples are also included in the technical scope.

(1) In Example 3, the air filter 43 is provided on the upstream side end portion of the canister pipe 38 that is significantly separated from the negative pressure valve 53. However, the air filter 43 may be disposed at a position in the canister pipe 38 that is close to the negative pressure valve 53.

(2) In Example 3, the cylindrical connection portion 52 constituting the secondary chamber 56 of the negative pressure valve 53 integrally protrudes from an outer circumference of the breather pipe 37. However, the cylindrical connection portion 52 may integrally protrude from an outer circumference of the canister pipe 38 and the cylindrical connection portion 52 may be a member separated from both of the breather pipe 37 and the canister pipe 38.

(3) In Example 3, the filter unit 41 may be detachable from the inlet pipe 12.

(4) In Examples 4 and 5, the secondary side casing 68 constituting the secondary chamber 69 of the negative pressure valve 70 is a member separated from the breather pipe 60. However, the secondary side casing may be integrally formed with the breather pipe.

(5) In Examples 4 and 5, the secondary side casing 68 is fitted into the breather pipe 60. However, the secondary side casing may protrude radially outward from the outer circumference of the breather pipe.

(6) In Examples 4 and 5, the canister pipe 61 is connected to the valve module 64. However, the canister pipe 61 may be provided in a state of not being connected to the valve module 64.

(7) In Example 6, the filter unit 100 is provided on the inlet pipe 12. However, the filter unit 100 may be provided on the outer circumference of the breather pipe. In this case, the internal space of the filter unit 100, the internal space of the negative pressure valve 86, and the internal space of the breather pipe constitute the air flow path.

(8) In Example 6, the cylindrical portion 87 that accommodates the valve body 98 of the negative pressure valve 86 integrally protrudes from the outer circumference of the inlet pipe 12. However, in a case where the negative pressure valve 86 is provided on the outer circumference of the breather pipe, the cylindrical portion 87 of the negative pressure valve 86 may integrally protrude from the outer circumference of the breather pipe.

(9) In Example 6, the cylindrical portion 87 protrudes from the outer circumference of the inlet pipe 12. However, the cylindrical portion 87 may integrally protrude in a racially inward direction from an inner circumference of the inlet pipe 12. In a case where the negative pressure valve 86 is provided on the breather pipe, the cylindrical portion 87 may integrally protrude radially inward from the inner circumference of the breather pipe.

(10) A configuration in Example 6 in which the cylindrical portion 87 of the negative pressure valve 86 integrally protrudes from the outer circumference of the inlet pipe 12 can be applied as a configuration in Example 4 in which a cylindrical portion of the secondary side casing 68 integrally protrudes from the outer circumference of the breather pipe 60 and can be applied as a configuration in which the cylindrical portion of the secondary side casing 68 integrally protrudes from the outer circumference of the inlet pipe 12 in a case where the valve module 64 is detachable from the inlet pipe 12, which is a modification example of Example 4.

(11) In Example 6, the filter housing 101 may be configured by air-tightly combining two detachable members. In this case, the air filter 110 becomes replaceable.

(12) In Example 6, the cylindrical portion 87 and the valve cap 91 are fixed to each other by the elastic engagement pieces 94. However, the cylindrical portion 87 and the valve cap 91 may be integrated with each other through welding.

What is claimed is:

1. A fuel supply device comprising:
   an inlet pipe, a first end of the inlet pipe configured to be connected to a fuel supply port and a second end of the inlet pipe configured to be connected to a fuel tank; and
   an air flow path, an upstream side end of the air flow path configured to be open to an outside and a downstream side end of the air flow path configured to be connected to the fuel tank,
   wherein the air flow path includes:
   a negative pressure valve configured to move a valve body to open a valve port when a pressure in the fuel tank becomes a negative pressure, the negative pressure valve includes a cylindrical portion that accommodates the valve body, and the cylindrical portion integrally protrudes outwardly in a radial direction from an outer circumferential surface of the inlet pipe, and
   an air filter disposed upstream of the negative pressure valve.

2. The fuel supply device according to claim 1, wherein the negative pressure valve and the air filter are integrated with each other and constitute a valve module that is detachable from the air flow path.

3. The fuel supply device according to claim 1, further comprising:
   a valve housing; and
   a filter unit, wherein:
   the negative pressure valve includes a primary chamber and a secondary chamber;
   the secondary chamber is formed in the valve housing;
   the valve body is accommodated in the secondary chamber;
   the primary chamber is formed in the filter unit;
   an inside of the primary chamber is partitioned into an introducing chamber communicating with an atmosphere and a clean chamber facing the valve port by the air filter; and
   the filter unit is configured to be detachable from the valve housing.

4. The fuel supply device according to claim 1, wherein the valve body is positioned within a cavity formed within the cylindrical portion.

5. A fuel supply device comprising:
   an inlet pipe, a first end of the inlet pipe configured to be connected to a fuel supply port and a second end of the inlet pipe configured to be connected to a fuel tank;

a valve housing;

a filter unit; and an air flow path, an upstream side end of the air flow path configured to be open to an outside and a downstream side end of the air flow path configured to be connected to the fuel tank, wherein the air flow path includes a negative pressure valve configured to move a valve body to open a valve port when a pressure in the fuel tank becomes a negative pressure, the negative pressure valve includes a cylindrical portion that accommodates the valve body, and the cylindrical portion integrally protrudes in a radial direction from a circumferential surface of the inlet pipe, and an air filter disposed upstream of the negative pressure valve, wherein:

the negative pressure valve includes a primary chamber and a secondary chamber;

the secondary chamber is formed in the valve housing;

the valve body is accommodated in the secondary chamber;

the primary chamber is formed in the filter unit;

an inside of the primary chamber is partitioned into an introducing chamber communicating with an atmosphere and a clean chamber facing the valve port by the air filter; and the filter unit is configured to be detachable from the valve housing.

6. The fuel supply device according to claim 5, wherein the filter unit includes a plurality of locking pieces such that the filter unit is configured to be detachable from the valve housing.

7. The fuel supply device according to claim 3, wherein the filter unit includes a plurality of locking pieces such that the filter unit is configured to be detachable from the valve housing.

* * * * *